United States Patent
LaCroix et al.

(10) Patent No.: US 9,234,601 B1
(45) Date of Patent: Jan. 12, 2016

(54) SECOND DUAL PRESET PRESSURE RELIEF VALVE

(71) Applicant: Kelso Technologies, Inc., Delta (CA)

(72) Inventors: Barry LaCroix, Corunna (CA); Mario Nunez, Chicago, IL (US)

(73) Assignee: Kelso Technologies Inc., Surrey, CA (US)

(*) Notice: Subject to any disclaimer, the term of this patent is extended or adjusted under 35 U.S.C. 154(b) by 0 days.

(21) Appl. No.: 13/999,997

(22) Filed: Apr. 12, 2014

Related U.S. Application Data

(63) Continuation-in-part of application No. 13/999,046, filed on Jan. 7, 2014, now abandoned, which is a continuation-in-part of application No. 13/998,078, filed on Sep. 28, 2013.

(51) Int. Cl.
*F16K 17/38* (2006.01)

(52) U.S. Cl.
CPC .................................... *F16K 17/383* (2013.01)

(58) Field of Classification Search
CPC ........................... F16K 17/0493; F16K 17/383
USPC ............. 137/511–543.23; 384/590, 618, 619, 384/620, 622
See application file for complete search history.

(56) References Cited

U.S. PATENT DOCUMENTS

| 3,974,850 | A  | * | 8/1976  | Pierson ...................... 137/493.9 |
| 5,031,790 | A  | * | 7/1991  | Keller ......................... 220/203.2 |
| 5,111,837 | A  | * | 5/1992  | Morris et al. .................... 137/72 |
| 5,325,882 | A  | * | 7/1994  | Forsythe et al. ................ 137/73 |
| 5,855,225 | A  | * | 1/1999  | Williams, III ................ 137/535 |
| 5,865,374 | A  | * | 2/1999  | Barta et al. .................. 239/263.1 |
| 6,843,605 | B2 | * | 1/2005  | Tamada et al. ............... 384/618 |
| 2003/0217770 | A1 | * | 11/2003 | Schultz et al. .................. 137/73 |
| 2009/0123106 | A1 | * | 5/2009  | Boussaguet et al. .......... 384/621 |
| 2011/0253221 | A1 | * | 10/2011 | Freiler .................. B65D 90/36 137/1 |
| 2012/0216885 | A1 | * | 8/2012  | Williams, III ................ 137/535 |

* cited by examiner

*Primary Examiner* — Eric Keasel
*Assistant Examiner* — Frederick D Soski
(74) *Attorney, Agent, or Firm* — Adrienne B. Naumann

(57) ABSTRACT

Described herein is a pressure relief valve that vents contents from a rail tank car or similar container at two preset pressures. The lower preset pressure is attained whenever specific valve attachment devices melt well below the spontaneous combustion temperature of the contents of a rail tank car or similar container. When these attachment devices melt, formerly attached corresponding constant force spring assemblies disconnect from a spring plate. Without these operative attached spring assemblies there is less force to oppose the pressure from the contents of rail tank car or similar container. With less opposing force, the contents of the rail tank car or similar container escape from under a dislodged sealing disk before the rail tank car or similar container (i) over pressurizes and causes the tank shell to fail or (ii) the contents self-combust, and both of which events cause an explosion.

17 Claims, 17 Drawing Sheets

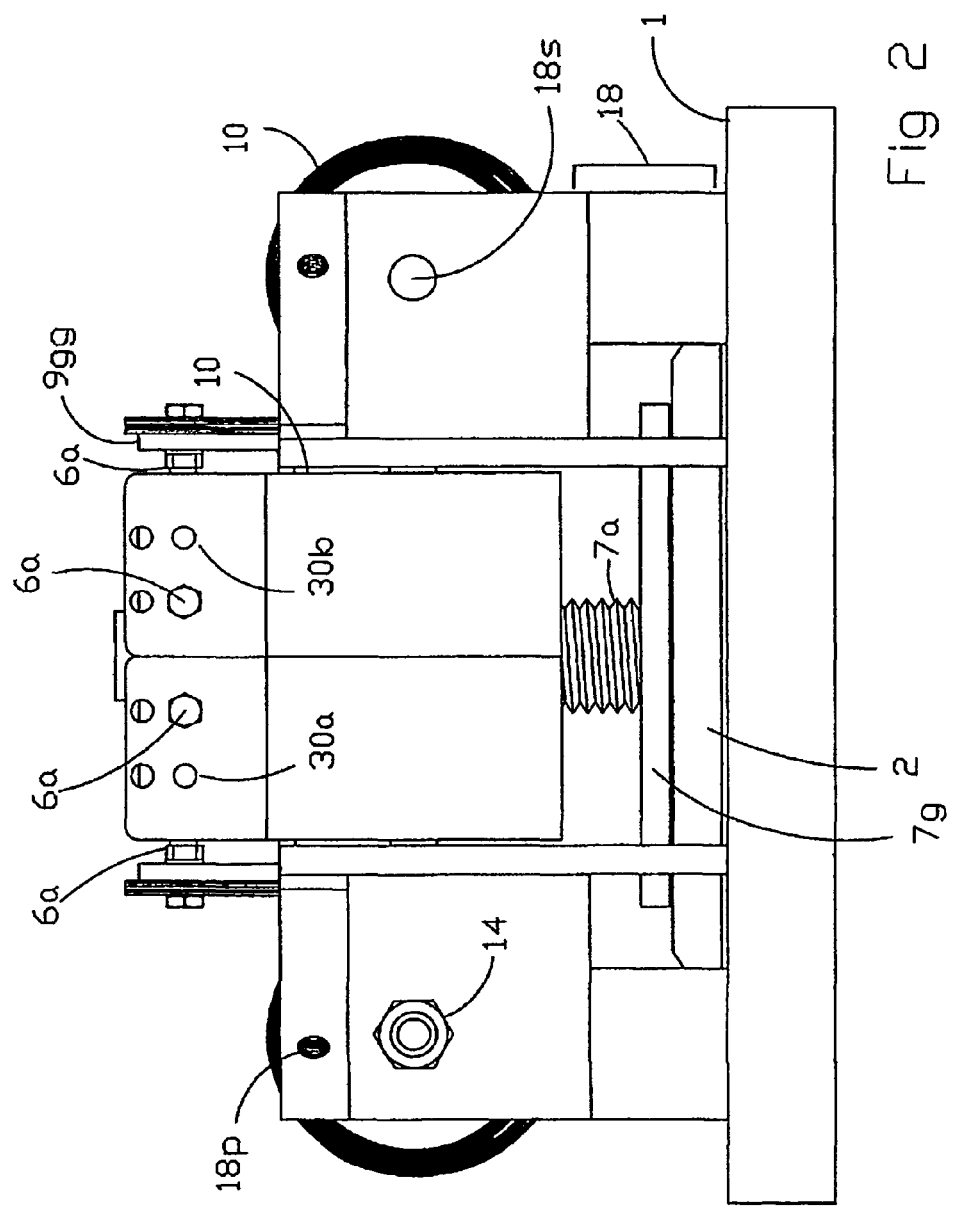

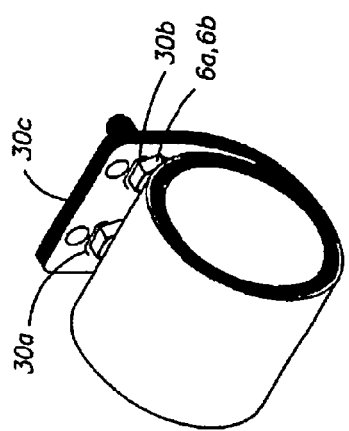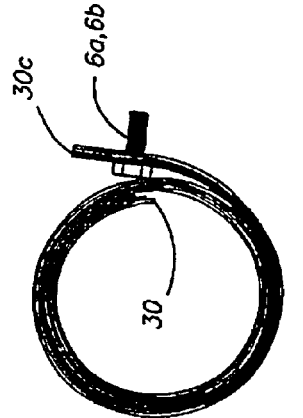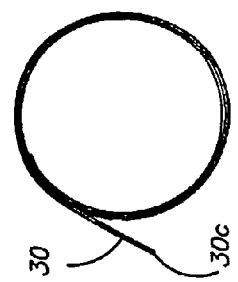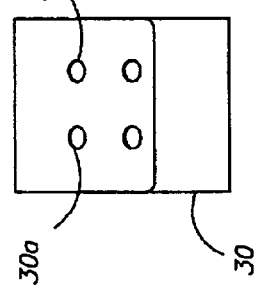
Fig 8D
Fig 8C
Fig 8B
Fig 8A

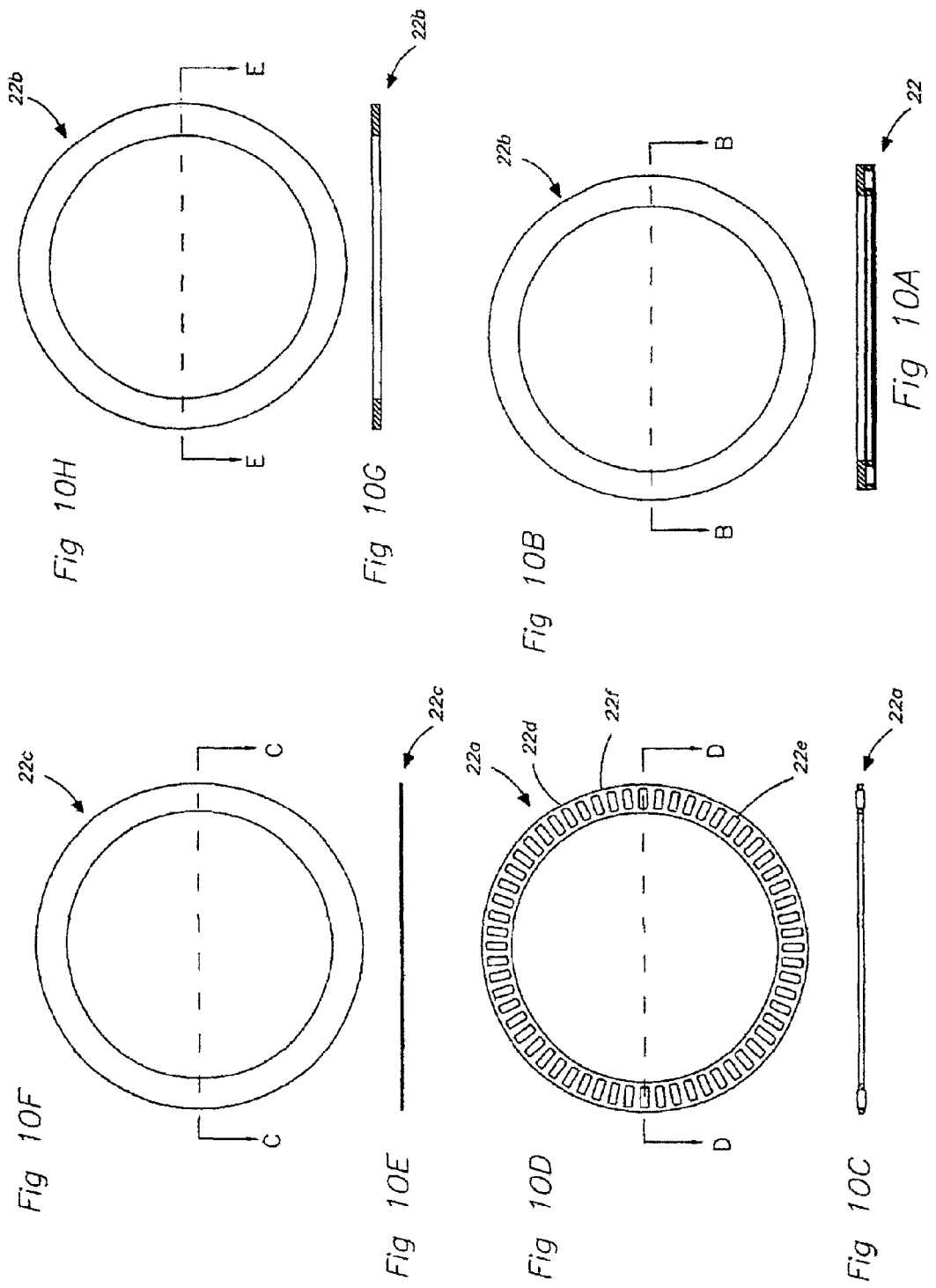

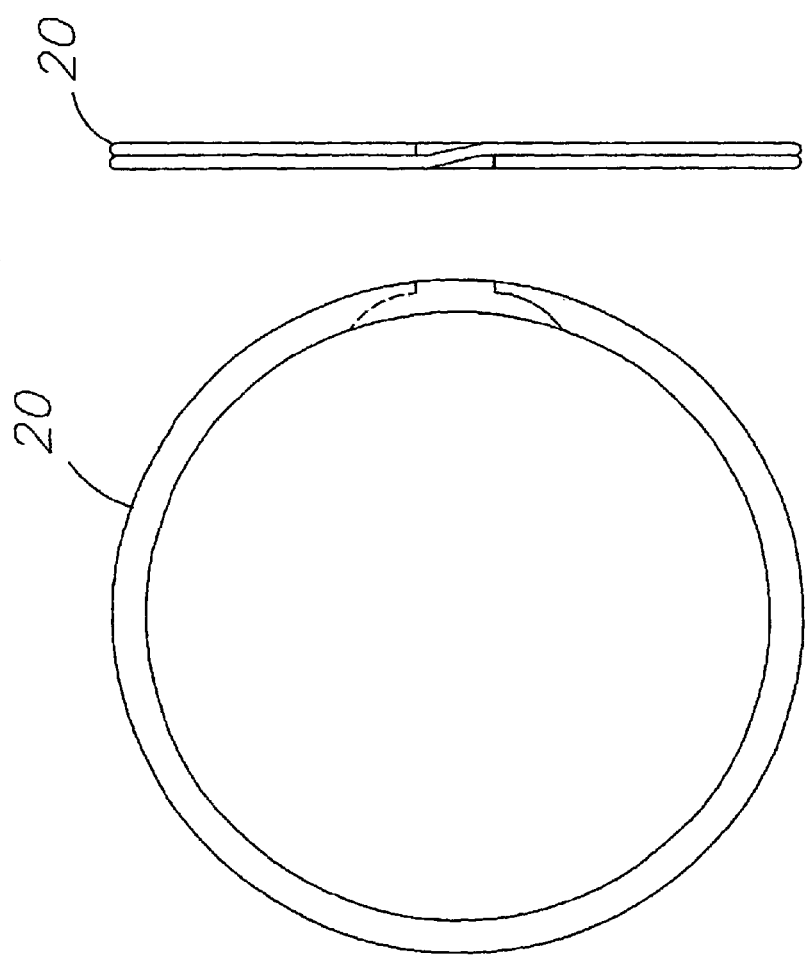

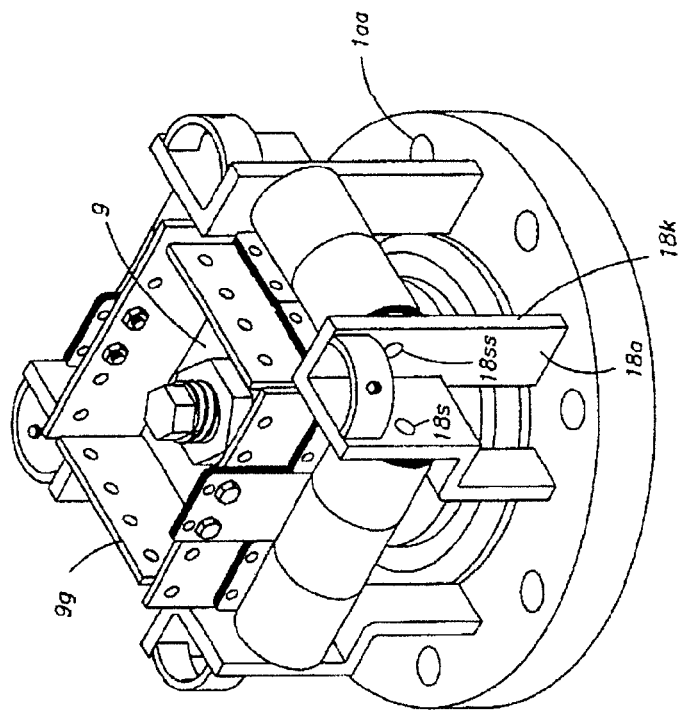
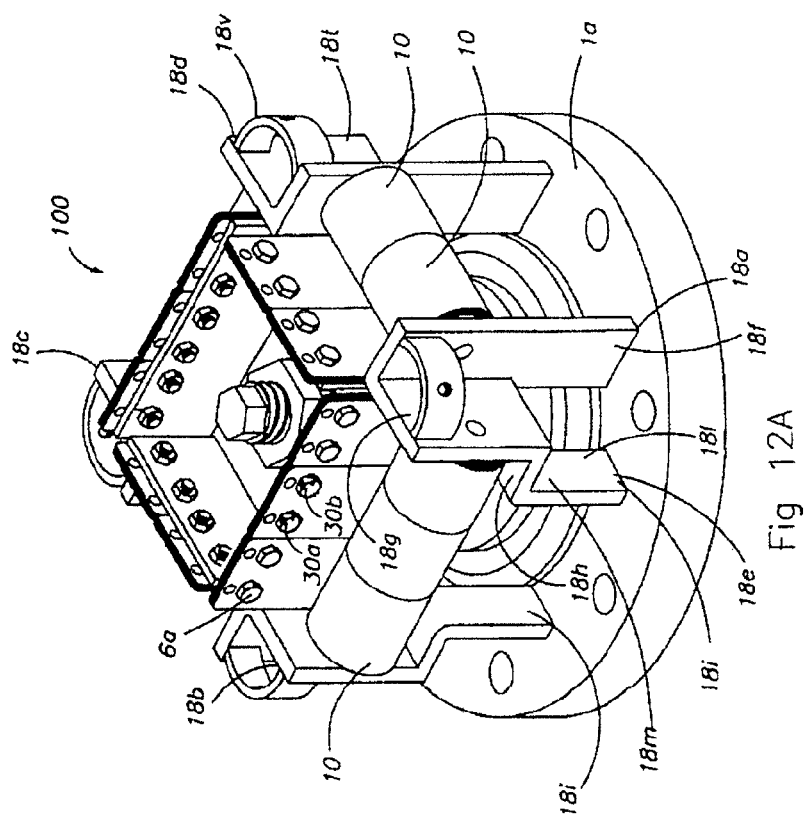
Fig 12B
Fig 12A

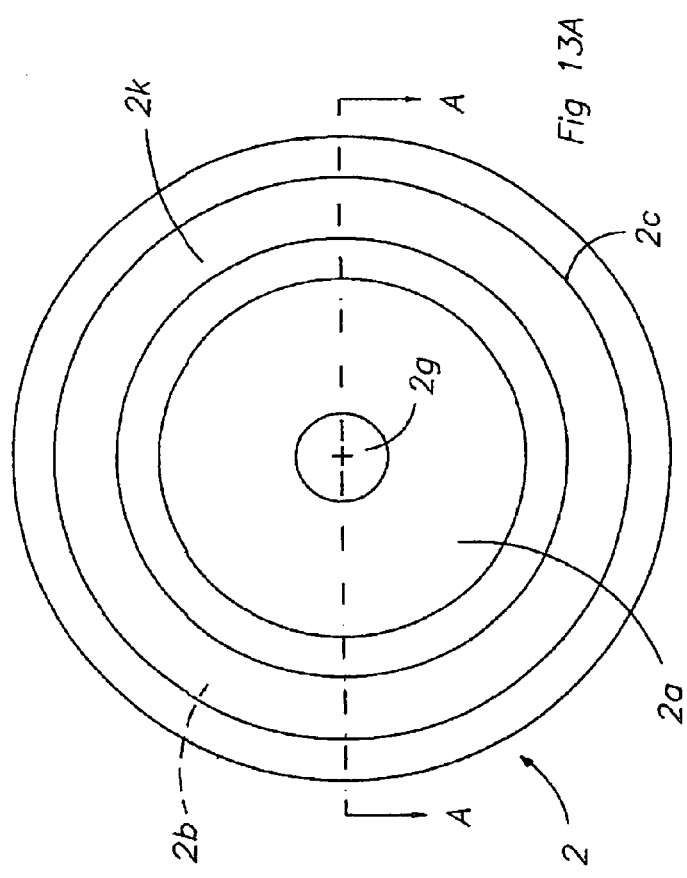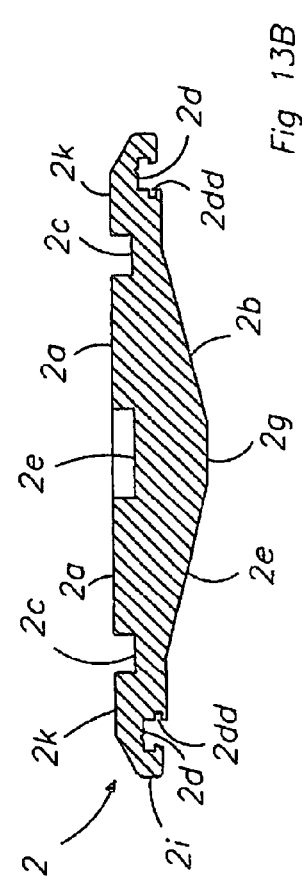

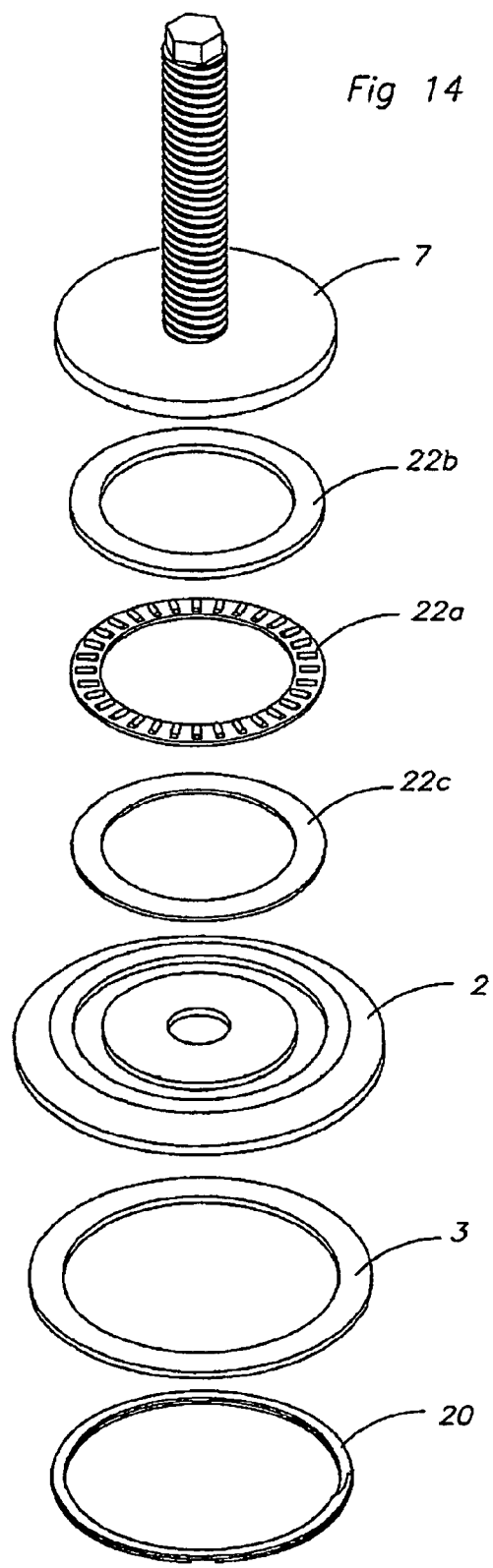

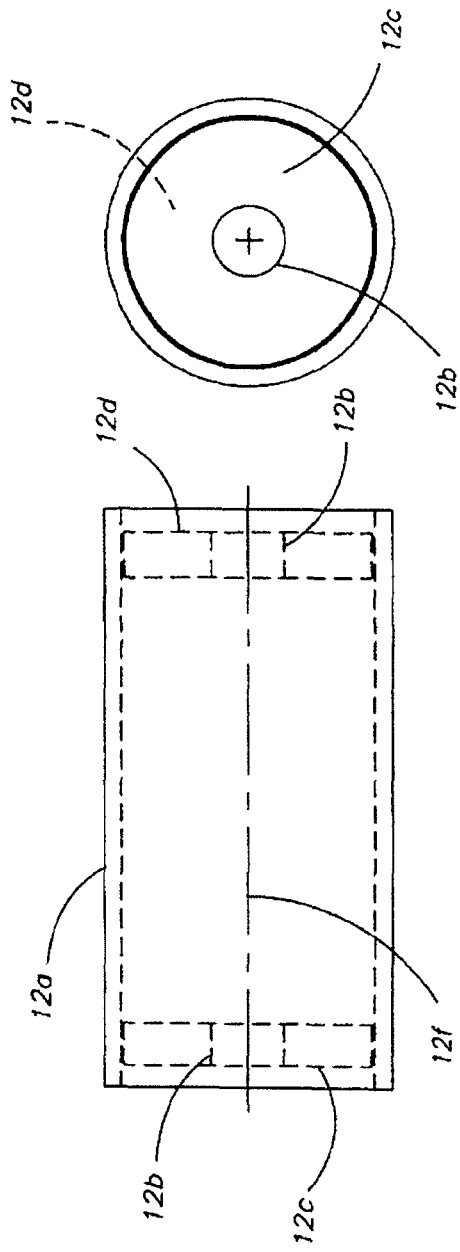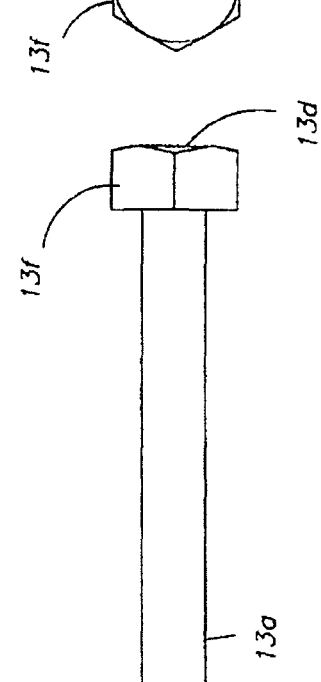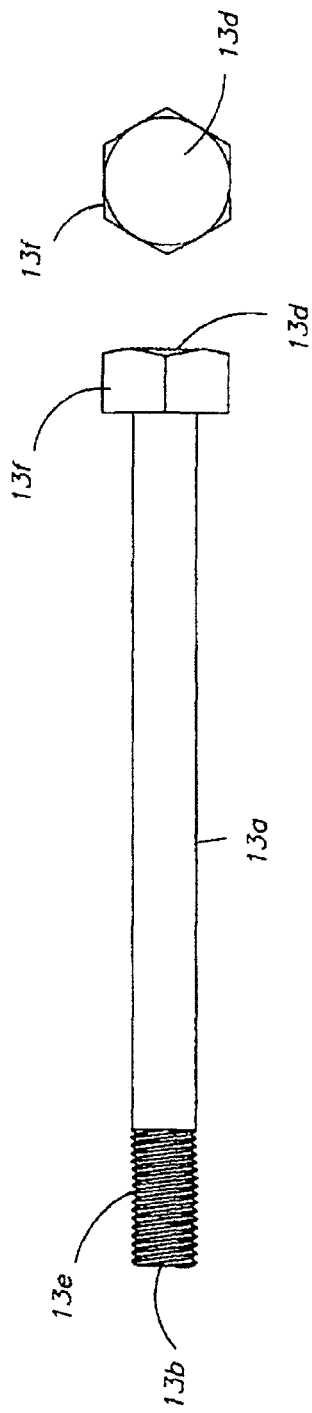
Fig 15A
Fig 15C
Fig 15B
Fig 15D

SECOND DUAL PRESET PRESSURE RELIEF VALVE

This application is a continuation in part of U.S. utility patent application Ser. No. 13/999,046 filed Jan. 7, 2014, which is a continuation in part of application Ser. No. 13/998,078 filed Sep. 28, 2013.

BACKGROUND OF THE INVENTION

This invention relates to a pressure relief valve for rail tank cars and similar or analogous containers with high and variable internal pressures. More specifically this invention relates to a pressure relief valve that can be preset at two quantitatively different pressures so that volatile contents inside a rail tank car or other transportable or stationary container can be released into the environment under two different sets of physical conditions. The purpose of a pressure relief valve is to allow the contents of the tank to escape such that the pressure within a tank cannot rise to the point where the tank shell will rupture. Most specifically this invention relates to a pressure relieve valve with two groups of spring assemblies, and wherein (i) one group of spring assemblies contains mechanical attaching components (ii) that melt at a different temperature than that of the mechanical attaching components of the remaining spring assemblies and (iii) thereby allowing for two different preset pressures.

U.S. Pat. No. 5,855,225 (Williams) discloses (i) four constant force spring assemblies (ii) aligned in a square configuration along a spring plate and (iii) mechanically attached to this same spring plate. The spring assemblies are preset to a specific pressure (tension/force) (i) at which the internal pressure from liquid or gas within the rail tank car or other similar transportable or stationary container to which the pressure relief valve is attached (ii) will overcome the spring assembly force upon a sealing disk and (iii) dislodge the sealing disk vertically from the opening within the valve flange.

The first problem with the Williams valve is that it cannot
  (i) be preset to dislodge the sealing disk at a lower predetermined pressure,
  (ii) in addition to the standard operating pressure and temperature resulting from the total number of operatively connected constant force spring assemblies.

Instead, the devices that mechanically attach the spring assemblies to a spring plate, and thereby provide opposing force that retains a sealing disk upon the vent aperture of the valve, are made of metal that does not melt at the appropriate temperatures. Consequently, William's mechanical attaching devices only provide venting of the tank or container content at a higher pre-set pressure. They also do not provide adequate venting in conditions where the rail tank car or other transportable or stationary container is engulfed in a fire or when the rail tank car shell or other container shell ruptures.

The invention described herein solves this first problem with fusible mechanical attaching devices to operatively attach force generating spring assemblies to a spring plate. These fusible mechanical attaching devices include, but not exclusively (ii) bolts, screws, or other mechanical connecting devices (iii) that are made of materials such as, although not exclusively, rigid plastics, rigid solid nylon and other nylon blends. The invention operatively positions these fusible devices along the elevated walls of a spring plate in a predetermined pattern with conventional bolts made of metal.

Consequently, in the current invention most constant force spring assemblies attach to the spring plate elevated walls by mechanical devices with a significantly lower melting temperature than those spring assemblies attaching with conventional metal attaching devices. When the temperature within or outside the rail tank car or other transportable or stationary container reaches a predetermined value, the fusible attaching devices melt. This melting mechanically disconnects corresponding constant force spring assemblies from the spring plate. The remaining two opposing constant force spring assemblies continue to operative connect the spring plate with metal attaching devices above this specific melting point.

More specifically, the centrally positioned constant force spring assembly in each opposing set of three spring assemblies attaches to the spring plate with metal attaching devices. The remaining attaching devices of the spring assemblies to the spring plate elevated walls are made of a rigid material with a melting temperature below the temperature that would cause the rail tank car or other transportable or stationary container to over-pressurize and explode in a high energy event. The two attaching devices that oppose each other and remain attached to corresponding spring assemblies and spring plat elevated walls are preferably made of steel or stainless steel. With only two operatively connected spring assemblies providing opposing force to the pressure from the heated rail tank car or similar container contents, the sealing disk dislodges at a lower pressure setting and the rail tank car or other transportable or stationary container content escapes prior to a potential explosion.

Another problem with the Williams valve occurs because the vertical rigid brackets of the William's pressure relief valve limits the number of constant force spring assemblies that can be placed within the valve enclosure. In contrast, the improved bracket design described herein allows for linear adjacent placement of additional spring assemblies along a spring drum and enclosed spring drum bolt; this additional length for operative placement of additional spring assemblies. These additional spring assemblies allow the dual set pressure valve to increase its potential opposing force to the contents of a rail tank car or similar transportable or stationary container.

More specifically, the linear distance of four inches between the Williams brackets limits the number of two inch wide spring assemblies that can be placed adjacent to his disclosed two spring assemblies. The current invention described herein solves this problem with design of a new vertical spring bracket. This new spring bracket design and structure accommodates up to three two inch wide spring assemblies adjacent to each other on opposing elevated walls of the spring plate of the valve. Furthermore, longer spring drums and spring drum bolts of the current invention assist in accommodating a total of ten spring assemblies (ii) while the Williams valves can only physically and structurally accommodate a maximum of eight spring assemblies.

In the current invention there are preferably ten spring assemblies, each of which is two inches in width. Each spring assembly is mounted upon two adjacent spring brackets with a partially stepped structure. In contrast, with the Williams valve design each spring bracket is straight vertically and linear in a uniform rectangular shape. This rectangular configuration allows only two spring assemblies between two adjoining brackets. However, in the current invention each spring bracket has a panel that is one-inch offset (i.e., the right bracket panel has a one inch offset to the right and the left bracket panel has a one-inch offset to the left) approximately one and one-half inches above the spring bracket end that attaches to the circular valve flange. This offset provides sufficient space for a third two inch wide spring assembly. Thus, each of two opposing sides of the valve can accommodate an additional two inch wide spring assembly with sufficient clearance for a wrench to attach the valve to a rail tank car or similar container mounting flange.

SUMMARY OF THE INVENTION

The present invention described herein is a pressure relief valve (i) for a rail tank car or other similar transportable or stationary closed container (i) to prevent a boiling liquid expanding vapor explosion [hereinafter 'bleve']. This combustion and subsequent explosion catastrophically occurs as a result of a fire condition that engulfs the rail tank car or other transportable or stationary container. This fire heats the contents and causes the pressure inside the rail tank car or other container to increase until the rail tank car or other transportable or stationary container shell ruptures. The heat from the fire also causes the tank shell to weaken. Both this resulting temperature, internal pressure and tank shell strength impact the point at which the tank shell will (i) rupture or (ii) allow the temperature of the contents to reach the self-combustion temperature causing a bleve. The dual preset pressure relief valve described herein comprises fusible spring bolts that melt and automatically disengage from the spring plate of the pressure relief valve below the temperature at which a bleve occurs.

If a fire occurs, then the volatile contents of the rail tank car during derailment or other catastrophic event (generally liquids and/or gases from the closed interior), or during a similar incident for a similar transportable or stationary container, must be discharged by the valve as rapidly as possible. To accomplish this physical event without human intervention, the tank must vent its enclosed volatile contents of gas and/or liquids before the tank shell weakens due to
  (i) the flame's heat and the pressure increases, or
  (ii) the temperature of the contents reaching the self-combustion level that causes the tank shell to rupture and result in a bleve.

To vent below the pressure that would cause the tank shell to rupture or allow content temperatures to reach the self-combustion point requires that the rail car tank (i) empty at a lower pressure than the standard pre-set pressure (ii) at which the rail tank car or similar transportable or stationary container would otherwise vent.

The current invention preferably comprises ten constant force leaf spring assemblies coiled around smooth cylindrical drums. Each spring drum contains a corresponding spring drum bolt, and each spring drum bolt attaches to two adjoining symmetrically arranged vertically protruding rigid spring brackets. These spring brackets attach to the upper surface of the circular valve flange in a symmetrical manner so that each spring bracket is equidistantly spaced from the other. A removable sealing disk reversibly covers and seals the circular venting valve aperture within the center of the pressure relief valve flange.

When properly assembled this circular venting aperture congruently aligns with and over the opening within the rail tank car or container through which the contents of the tank or container vent exteriorly. The goal is to spontaneously vent contents of the rail tank car or similar container whenever the opposing pressure of the valve spring leaf valve assemblies is overcome by the internal pressure of the railway tank or similar container contents.

With the invention described herein, mechanical connecting devices attach several leaf spring assemblies of the valve to a rigid spring plate. Depending upon how tightly the spring assemblies are wound and attached to this plate, there is a resulting mechanical opposing spring assembly biased mechanical force upon the sealing disk.

This sealing disk opposes the internal pressure of the tank contents which escape through the rail tank car or container opening when the sealing disk does not seal the opening in the tank car or similar container.

Under standard ambient air temperatures and otherwise standard operating conditions, the sealing disk seal is not overcome by pressure from gases or liquids within the tank; consequently its dislodgement to vent tank contents is unnecessary. Instead, under standard conditions. the sealing disk is dislodged only when the pressure from contents within the rail tank car, or other similar transportable or stationary container, overcomes the opposing force of all operatively connected constant force spring assemblies due to conditions unrelated to a fire. These conditions not related to fire include, although not exclusively, overloading the tank or container during a filling operation, or using excessive pressure to unload the rail tank car or container.

Fusible bolts attaching the spring assemblies to the spring plate elevated walls are the mechanical attachment devices of choice for the current invention. When these mechanical connectors melt in a fire condition, the corresponding formerly attached spring assemblies (i) will disconnect from the spring plate and (ii) no longer contribute opposing default force to oppose the internal pressure within the tank. The sealing disk will then dislodge from the valve opening at a lower default pressure. Pressure from the tank's heated contents will then (i) overcome this lower spring assembly pressure and (ii) escape from the tank interior well before the tank shell ruptures or the contents temperature rises to the self-combustion temperature to cause a bleve.

In situations with fire and flame, the pressure relief valve set at 75 pounds per square inch (psi) attains a temperature of approximately 500 degrees F. However, a potential explosion from rail tank car shell rupture or heat can occur at other temperatures, depending upon the contents and strength of the tank shell. At this point a fire occurs, and the fusible bolts connecting the spring assemblies to the valve spring plate melts at this temperature. When these start to discharge fusion bolts are thereby disconnected from corresponding spring assemblies, there is reduction of the valve start to discharge pressure.

Without fire but when (i) other emergency conditions exist, such as overfilling when loading or over pressuring when unloading the rail tank car or other similar transportable or stationary container and (ii) the conventional set pressure is 75 psi, the rail tank car or similar transportable or stationary container dose not require a lower start-to-discharge pressure. However, when the valve comprises fusions bolts as described for the current invention, the tank vents 100 percent of its contents well before the tank shell ruptures from the effects of fire and temperature, and thereby prevents an explosion from escaping volatile contents.

It is therefore a goal to provide a cost-effective manner in which to prevent catastrophic explosions, in rail tank car transports and other similar transportable or stationary containers, with a valve that allows the escape of volatile tank contents below the pressure that (i) causes the tank shell to rupture or (ii) the contents to achieve the self-combustion temperature due to fire.

It is another goal to provide mechanical attaching devices that melt and thereby reduce the opposing pressure upon a sealing disk of a pressure relief valve (i) at a pressure below the pressure that would cause the tank shell to rupture due to fire and (ii) prevent the contents from achieving the self-combustion temperature.

These and other features will become apparent from the drawings attached to this application and the detailed description of the invention which follows.

BRIEF DESCRIPTION OF THE DRAWINGS

FIG. 2 illustrates an anterior view of the modified pressure relief valve of FIG. 1 with the dome-like cap removed.

FIG. 8A illustrate an anterior view of an individual leaf of the constant force spring assembly of FIG. 8C.

FIG. 8B illustrates a lateral view of an individual leaf of the constant force spring assembly of FIG. 8C.

FIG. 8C illustrates a lateral view of a multi-leaf constant force spring assembly.

FIG. 8D illustrates an isometric view of a multi-leaf constant force spring assembly.

FIG. 10A illustrates a sectioned view of the bearing assembly along line BB of FIG. 10.

FIG. 10B illustrates a top plan view of the bearing assembly.

FIG. 10C illustrates a sectioned view of the needle bearing along line DD of FIG. 10D.

FIG. 10D illustrates a top plan view of the needle bearing.

FIG. 10E illustrates a sectioned view of the bottom thrust washer along line CC of FIG. 10F.

FIG. 10F illustrates a top plan view of the bottom thrust washer.

FIG. 10G illustrates a sectioned view of the top thrust washer along line EE of FIG. 10H.

FIG. 10H illustrates a top plan view of the top thrust washer.

FIG. 11A illustrates a close up isolated top plan view of the retaining ring.

FIG. 11B illustrates a close up lateral view of the retaining ring of FIG. 11A.

FIG. 12A illustrates an isometric view of the pressure relief valve with cover removed and at set position prior to exposure to fire.

FIG. 12B illustrates an isometric view of the pressure relief valve with cover removed at set position after exposure to fire.

FIG. 13A illustrates a top plan view of a sealing disk.

FIG. 13B illustrates a section view of a sealing disk along line A-A of FIG. 13A.

FIG. 14 illustrates an exploded view of the bearing assembly and other related components.

FIG. 15A illustrates an isolated longitudinal view of a spring drum.

FIG. 15B illustrates an isolated longitudinal view of a spring bolt.

FIG. 15C illustrates the distal or proximal end view of a spring drum.

FIG. 15D illustrates the hex distal end view of a spring bolt.

DETAILED DESCRIPTION OF THE PREFERRED EMBODIMENT AND OTHER EMBODIMENTS

Figure 1:
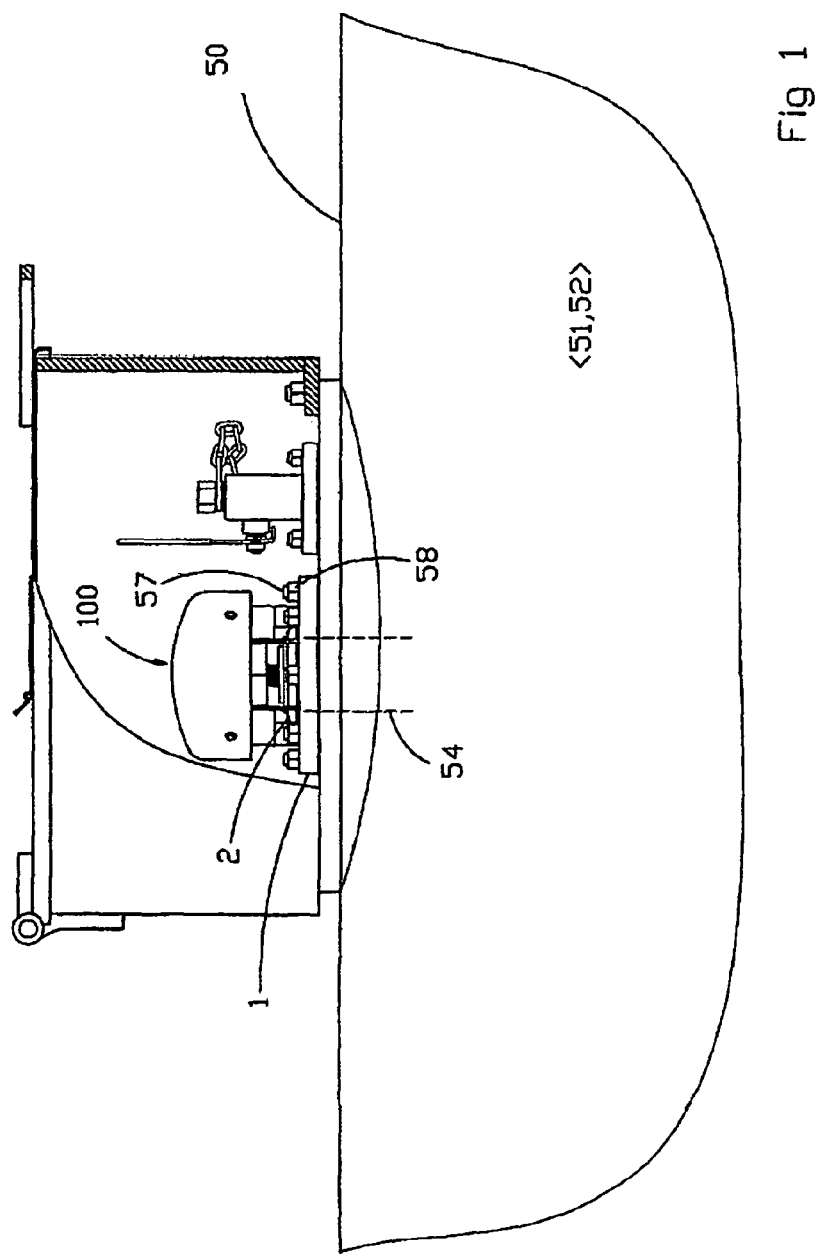
FIG. 1 illustrates a partial anterior view of the modified pressure relief valve. in the preferred embodiment mounted upon a rail car.

In the following discussion all reference numerals in a particular drawing figure correspond to the same structures referenced by these same numerals in the remaining figure drawings.

I. The Preferred Embodiment and Other Embodiments of Dual Preset Pressure Relief Valve 1

Valve Flange 1

Figure 7:
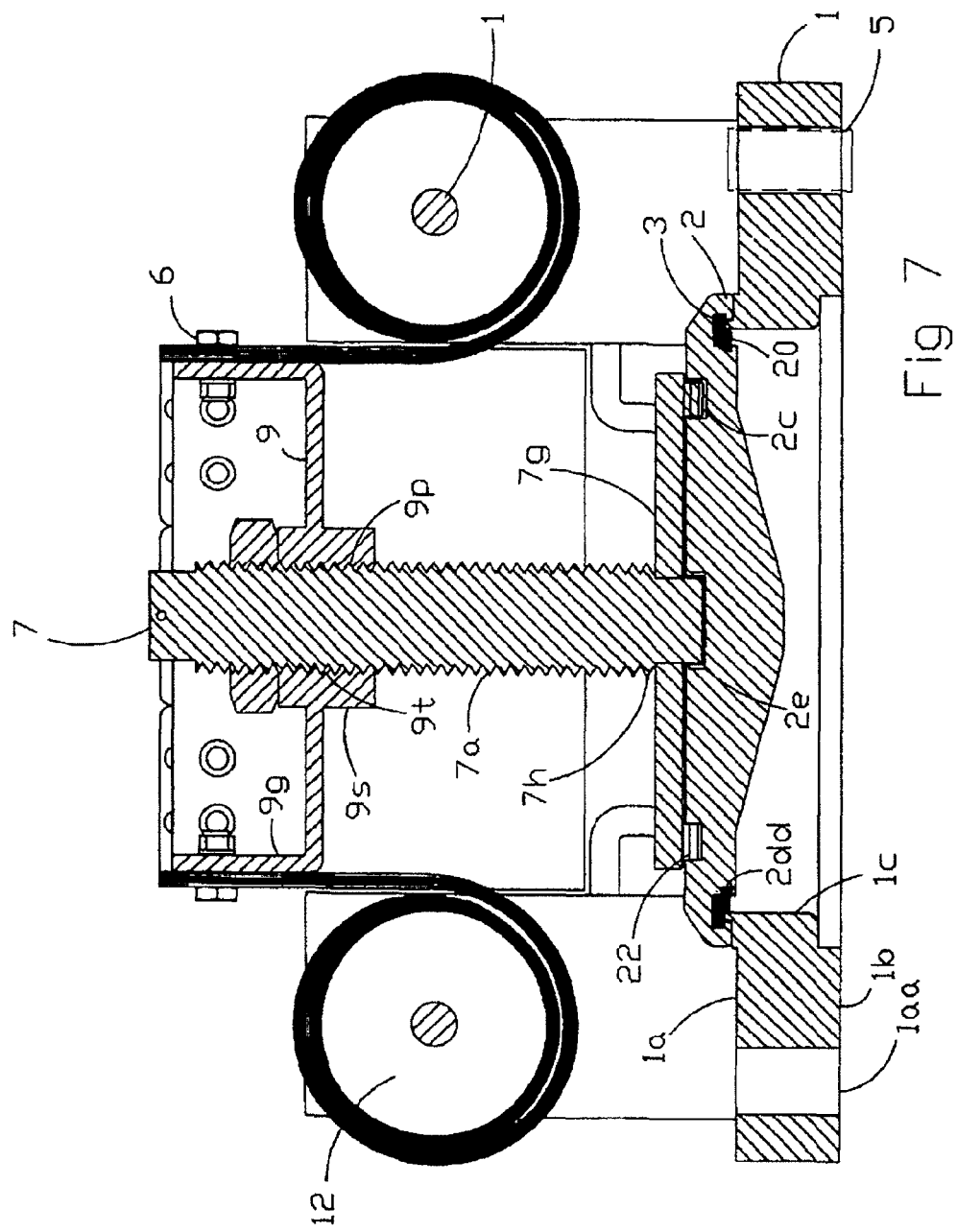
FIG. 7 illustrates a sectional view along line A-A in FIG. 5.
Figure 9:
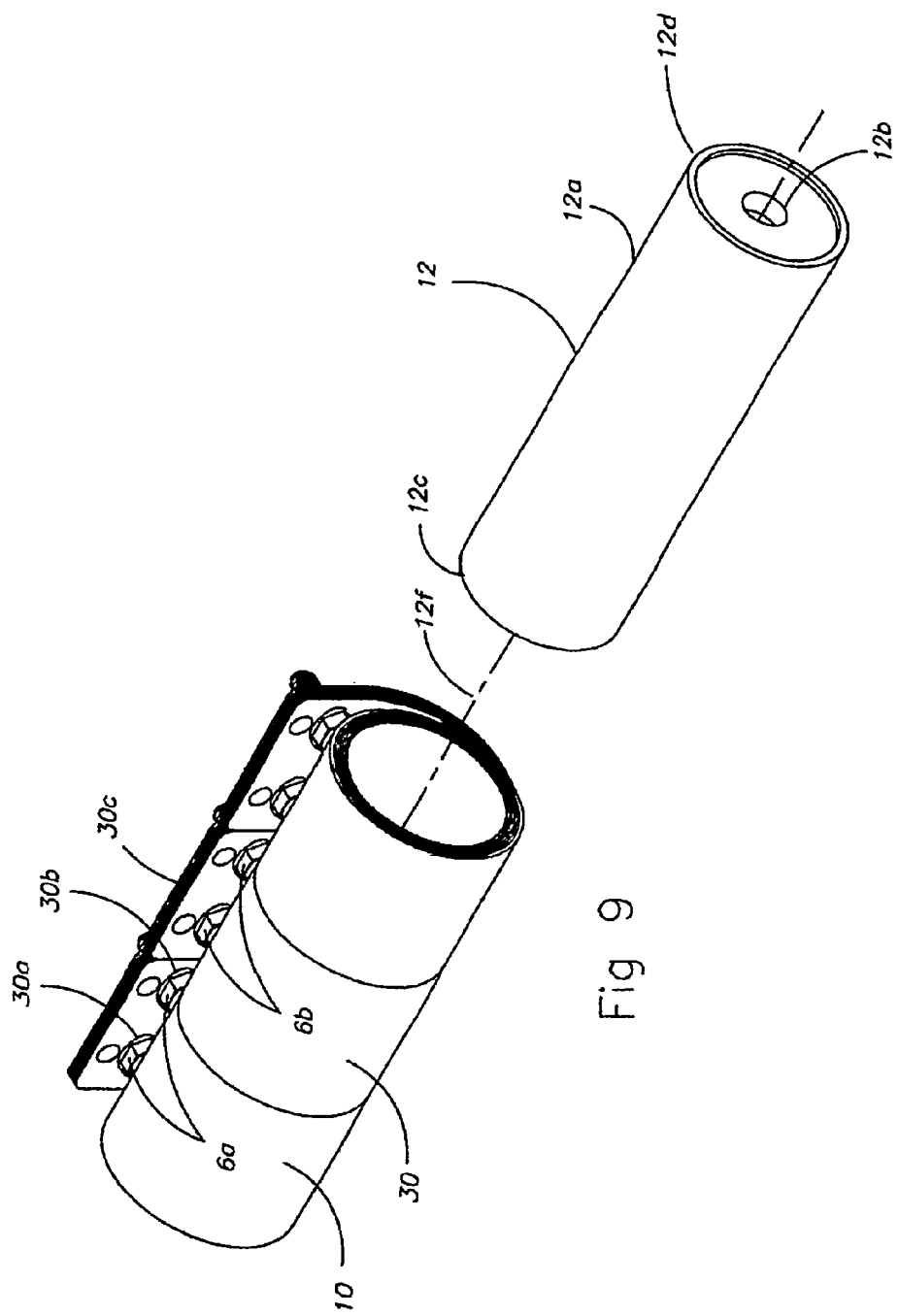
FIG. 9 illustrates an isometric exploded view of spring assemblies and spring drum.

Referring to FIGS. 1 and 7, the preferred embodiment of the dual preset pressure relief valve 100 comprises a circular flat valve flange 1 with (i) eight circular openings 19*aa* for inserting rail car surface attachment stud 57 and nut 58 (ii) to upper railway tank car or similar transportable or stationary container surface 50. Each circular opening 19*aa* is preferably (i) three-quarters inch in diameter and (ii) equidistantly located from the other along the external circular edge 1*bb* of the flat valve flange 1. Circular flat valve flange 1 is preferably (i) made of A516 grade 70 steel or 316L SS stainless steel (ii) twelve inches in circular diameter and (iii) one and one-eighth inches in thickness. Flat valve flange 1 comprises a lower flange surface 1*b* and an upper flat flange surface 1*a*. Flat valve flange 1 also preferably comprises a single centrally positioned large circular vent flange aperture 1*c*, and vent aperture 1*c* is preferably six and one-half inches in circular diameter.

Flexible Circular Seal 3, Spiral Ring 20 and Sealing Disk 2

Figure 6:
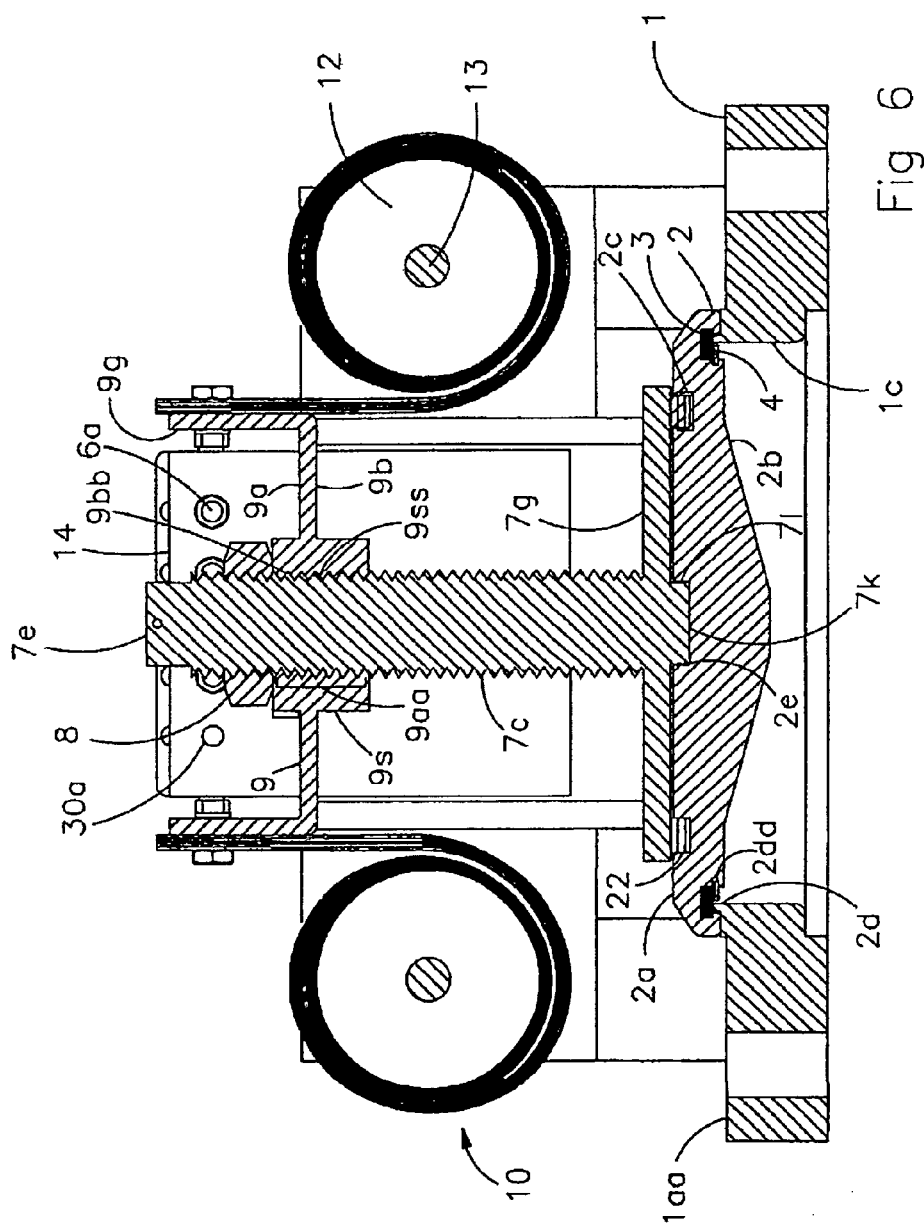
FIG. 6 illustrates a sectioned view of the modified pressure relief valve of through line B-B in FIG. 5.

Referring to FIG. 6, flexible circular seal 3 is preferably (i) a single O-ring or gasket (ii) 6.816 inches in outer diameter (ii) 0.125 inch in thickness and (iv) made of an elastomeric or flouroelastomeric material such as, but not exclusively, rubber. Flexible circular seal 3 provides a tight fitting leak-resistant connector between (i) valve circular flange upper surface 1*a* (ii) sealing disc 2 infra and seal retainer 4. Flexible circular seal 3 is snugly and continuously lodged within single recessed sealing disk lower channel 2*d*.

Referring to FIGS. 1, 3A, 3B, 4 and 6, single sealing disk 2 preferably (i) coaxially and concentrically aligns with circular flange vent aperture 1*c* and (ii) vertically aligns with tank aperture 54 whenever pressure relief valve 100 appropriately attaches to a rail tank car 51 or other similar container 52. Sealing disk 2 is preferably (i) a solid integral reversibly removable circular component (ii) 7.394 inches in diameter (iii) 1.063 inch in thickness and (iv) made of 304 SS stainless steel. Single circular sealing disk 2 has a single upper disk circular surface 2*a* and a single lower disk circular surface 2*b*. As best seen in FIG. 7, circular sealing disc 2 is positioned between adjustment screw 7 and circular valve flange upper surface 1*a*.

As best seen in FIGS. 4, 6, 7 and 13B, lower sealing disk surface 2b preferably comprises (i) a single circular continuous circular sealing disk channel 2d and (ii) a single continuous circular sealing disk channel lip 2dd. Lower circular sealing disk channel 2d is preferably 6.816 inches in maximum exterior circular diameter, while circular sealing disk lip 2dd is preferably 6.101 inches in maximum exterior circular diameter. Sealing disk circular channel 2d and circular sealing disk channel lip 2dd are preferably (i) contiguous with each other and (ii) concentric with sealing disk exterior edge 2i and each other.

Figure 4:
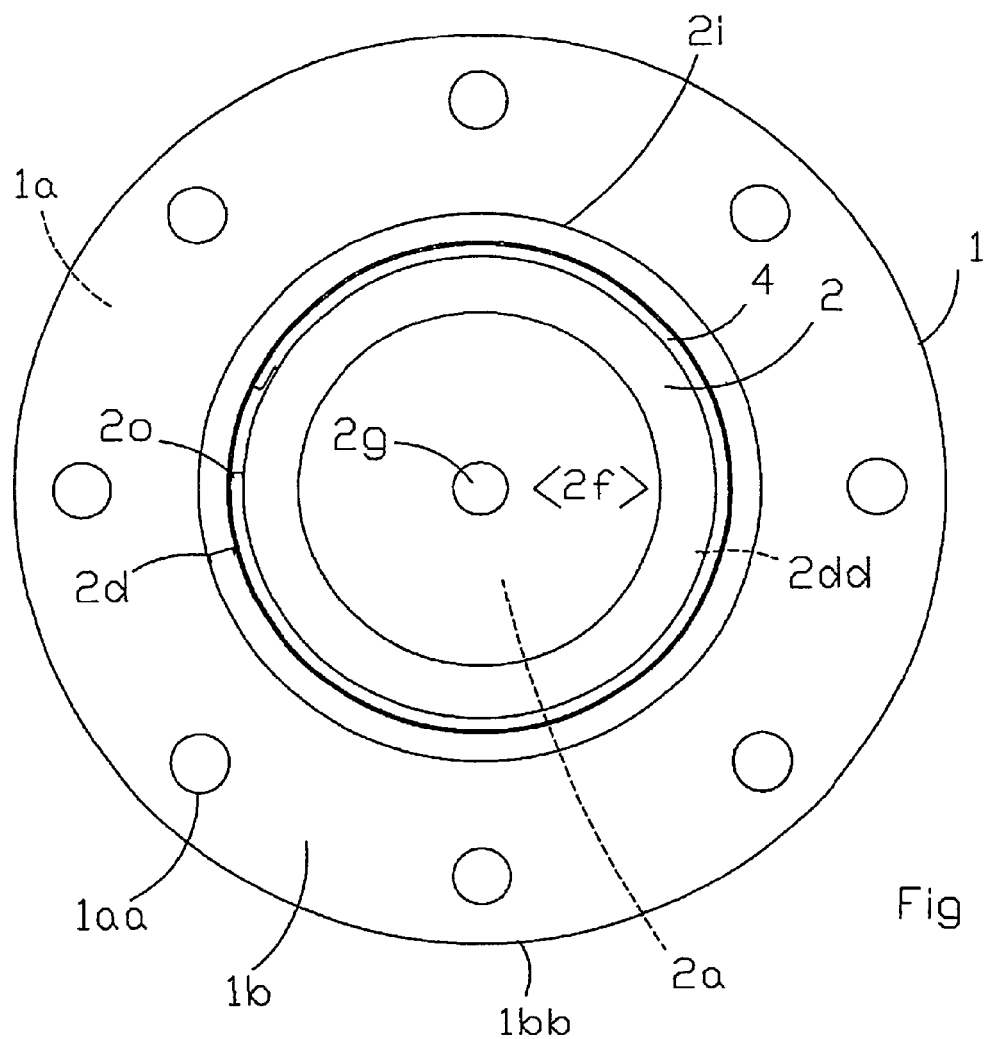
FIG. 4 illustrates a bottom plan view of the modified pressure relief valve of FIG. 1.

Referring to FIGS. 4 and 13B, lower sealing disk surface 2b contains (i) circular retainer channel 2d for mechanical retention of circular flexible seal 3. Single lower circular disk channel 2d is preferably (i) 0.715 inch in width (ii) one-eighth inch in depth and (iii) 6.101 inches of inside diameter. Circular flexible seal 3 preferably (i) snugly fits within lower disk channel 2d and (ii) is approximately one-eight inch in height within channel 2d. Lower circular disk channel 2d is preferably (i) adjacent and contiguous to second lower circular disk channel lip 2dd (ii) 5.932 inches in diameter (iii) 0.085 inch in width and (iv) one-sixteenth inch in height. Lower sealing disk surface 2b comprises a conical configuration to improve the flow of air through valve 100, as compared to previous flat lower surfaces that results in greater turbulence. Channels 2c, 2d, channel lip 2dd and indentation 2e are preferably machined, because machining improves mechanical leak tight sealing properties of sealing disk 2.

Seal retainer 20 tightly but reversibly continuously inserts (i) into lower circular disk channel 2dd. This insertion (i) continuously engages and contacts circular flexible seal 3 to create a leaf-proof seal (iii) whenever sealing disk 2 is properly and congruently positioned over tank or similar container vent opening 54 (iv) under the appropriate pressure and temperature. Referring to FIGS. 4, 11A, 11B and 14, preferably a single spiral wound ring 20 is inserted within second circular disk circular channel lip 2dd. Spiral wound ring 20 more effectively prevents removal or loss of the mechanical retention between first sealing disk lower circular channel 2d and seal retainer lip 4f. Spiral wound ring 20 is preferably made of carbon spring steel, 302 stainless steel or 316 stainless steel.

Referring to FIGS. 6, 13A, 13B, upper sealing disk surface 2a comprises an upward sloping surface from exterior sealing disk circular edge 2i to raised circular disk platform 2k. Sealing disk upper surface 2a contains a continuous circular groove 2c into which bearing assembly 22 inserts in the preferred embodiment, see infra. Raised circular disk platform 2k is preferably (i) concentric with exterior sealing disk circular edge 2i (ii) one-quarter inch in height (iii) 5.071 inches in diameter and (iv) 0.71 inch in raised circular platform width.

Raised circular platform 2a is preferably concentric with circular upper sealing disk surface 2k. Raised circular disk platform 2a preferably comprises a single concentrically positioned rigid circular indentation 2e (ii) into which a screw assembly lowermost tip 7k reversibly inserts, see infra. Circular indentation 2e is preferably (i) one inch in circular diameter (ii) one-quarter inch in depth and (iii) comprises a flat rigid smooth bottom indentation surface 2hh. Circular indentation 2e is also centrally positioned within the center of upper sealing disk surface 2k.

Bearing Assembly 22

As best seen in FIGS. 7,10A through 10H and 14, single circular bearing assembly 22 continuously inserts into single continuous circular groove 2c within disk upper surface 2a. Bearing assembly 22 preferably includes (i) single needle roller bearing and gage 22a (ii) single top thrust washer 22b and (iii) single bottom thrust washer 22c.

Needle roller bearing and gage 22a comprise (i) a circular ring shaped cage nut 22d with multiple radial slots 22f and (ii) each slot 6f houses a single needle roller bearing 22e. Bearing assembly 22 is positioned between (i) sealing disk upper surface 2a and (ii) screw disk assembly lowermost end 7k. Bearing assembly 22 provides a smooth surface for rotation of sealing disc 2 and adjustment screw 7. Bearing assembly 22 also prevents excessive wear and friction on contacting surfaces of adjustment screw 7 and sealing disk 2 that results from the increased force from multiple spring assemblies 10 infra.

Spring Brackets 18

Figure 16:
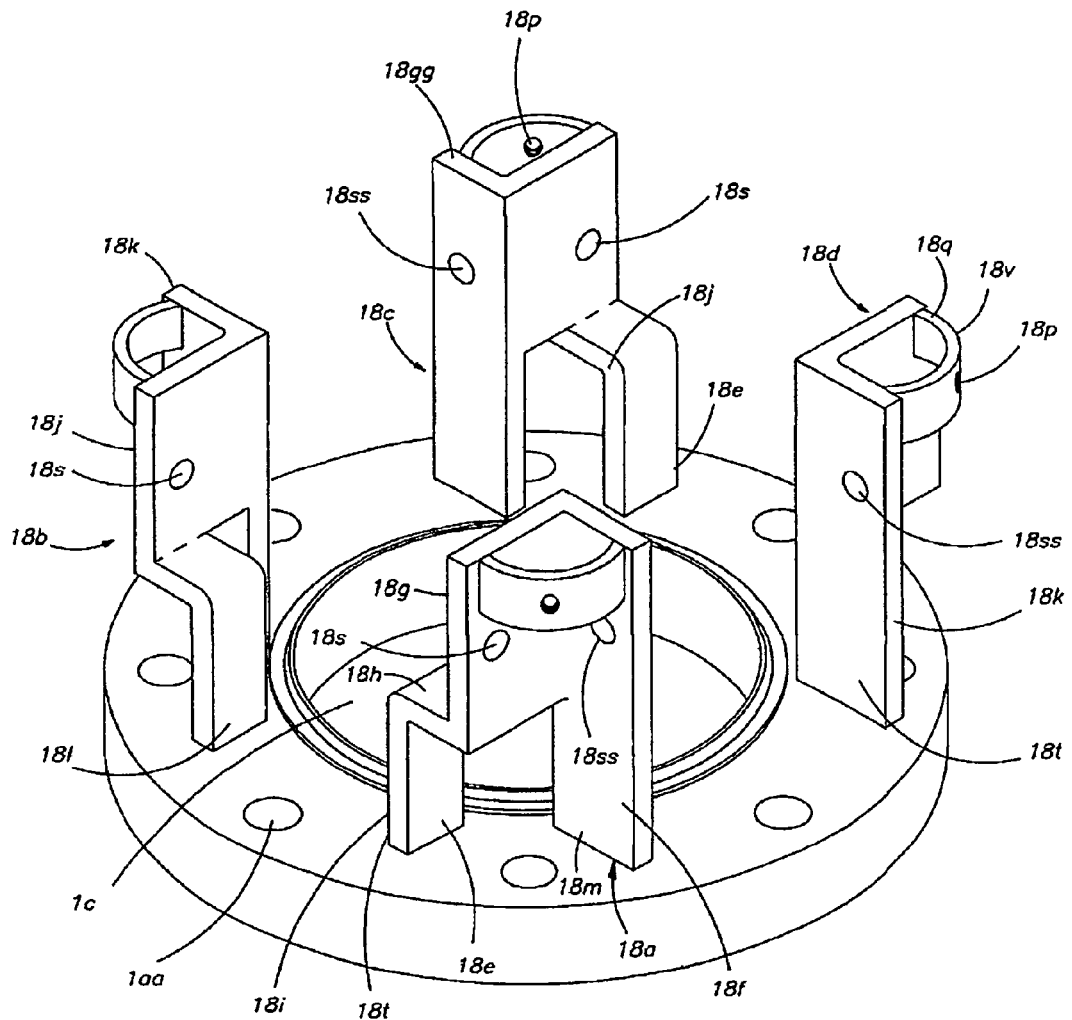
FIG. 16 illustrates an isomeric isolated view of spring brackets along the flat circular valve flange.

As best seen in FIGS. 12A, 12B and 16, pressure relief valve 100 preferably comprises first, second, third and fourth spring brackets 18a, 18b, 18c; 18d respectively [collectively spring brackets 18]. Spring brackets 18 are preferably (i) identical to each other (ii) rigid and (iii) smooth along their exterior surfaces 18t. Spring brackets 18 (i) rigidly protrude vertically from flat valve flange upper surface 1a and (iv) are perpendicular to flat valve upper surface 1a. Each spring bracket 18 is preferably (i) perpendicular (ii) rigid (iii) upwardly protruding from and (iii) welded to flat valve flange upper surface 1a.

Each spring bracket 18 is equidistantly spaced from remaining spring brackets 18 along the circumference of valve circular flat flange upper surface 1a. Spring brackets 18 are positioned exterior to valve flange circular central opening 1c whenever dual preset pressure relief valve 1 is properly assembled. Each spring bracket 18 is preferably made of angle iron, A36 carbon steel or 304 SS stainless steel.

Each spring bracket 18 preferably comprises a (i) single first vertical, stepped bracket panel 18e and (ii) single second vertical longitudinal rectangular bracket panel 18f. Second vertical rectangular bracket panel 18f has the same height; width and thickness as first stepped bracket panel 18e and protrudes rigidly and in a vertical manner perpendicular to valve circular flange flat upper surface 1a. Each first stepped bracket panel 18e preferably comprises a (i) first single upper rectangular bracket segment 18g (ii) single second parallel rectangular bracket segment 18h and (iii) third bottom perpendicular rectangular bracket segment 18i.

First upper rectangular bracket segment 18g is preferably (i) rigid and (ii) perpendicular to flag valve flange upper surface 1a. Second parallel bracket segment 18h is preferably (i) rigid and (ii) parallel to circular flat valve flange upper surface 1a. Each spring bracket is preferably a vertical height of 5.03 inches for both (i) stepped bracket panel 18e and (ii) longitudinal rectangular bracket panel 18f. First stepped panel vertical segment 18g is preferably 3.53 inches in vertical height/length, while second parallel rectangular segment 18h is preferably 1.00 inch in parallel longitudinal length. Third perpendicular rectangular segment 18i is preferably 1.54 inches in vertical height/length.

Each
(i) second longitudinal rectangular panel 18f,
(ii) first stepped vertical rectangular segment 18g,
(iii) second stepped parallel rectangular segment 18h, and
(iv) third stepped perpendicular rectangular segment 18i is preferably 1.75 inches in width.

Third lowest perpendicular rectangular bracket segment 18i is preferably the same thickness as first and second bracket rectangular segments 18g, 18h (IV) rigid and (v) perpendicular to circular valve flange flat surface 1a. Each first and second spring bracket panel 18e, 18f respectively has a first and second interior bracket panel longitudinal edge 18j,

18k respectively. Each vertical bracket panel 18e, 18f preferably comprises (i) a single anterior and a single posterior surface 18l, 18m respectively and (ii) surfaces 18l, 18m are preferably flat and smooth. Each first exterior rack panel longitudinal edge 18j is stepped while each second exterior bracket panel longitudinal edge 18k is linear and straight in longitudinal configuration. Each stepped bracket panel 8e preferably comprises (i) two bracket panel longitudinal edges 18j (ii) that are identical to each other. Each second vertical rectangular bracket panel 8f preferably comprises (i) two bracket panel longitudinal edges 18k (ii) that are identical to each other.

As best seen in FIGS. 12A, 12B and 16 (i) each third perpendicular bracket segment 18i of first spring bracket 18a (ii) preferably faces towards and opposes the single adjoining third perpendicular segment 18i of second spring bracket 18b. Similarly, (i) each third perpendicular bracket segment 18i of third and fourth brackets 18c, 18d respectively are oriented so (ii) each third perpendicular bracket segment 18i of spring bracket 18c opposes and faces segment 18i of spring bracket 18d. Each third lowest perpendicular bracket segment 18i is preferably the same distance from valve circular vent aperture 1c perimeter as remaining segments 1. Second parallel bracket segment 8h and third lowest perpendicular bracket segment 18i provide adequate clearances for a wrench to manipulate nuts 58.

Referring to FIGS. 2, 12A, 12B and 16, each first and second flat bracket panel 18e, 18f respectively also comprises a single first and second bracket panel opening 18s, 18ss respectively. First and second bracket panel opening 18s, 18ss are each preferably positioned proximal to and below the midpoint of the corresponding upper bracket panel edge 18gg. First and second bracket panel openings 18s or 18ss respectively each receive a corresponding single first and second spring bolt end 13a or 13b respectively, see infra. Each bracket panel opening 18s, 18ss is preferably one-half inch in circular diameter.

Figure 3B:
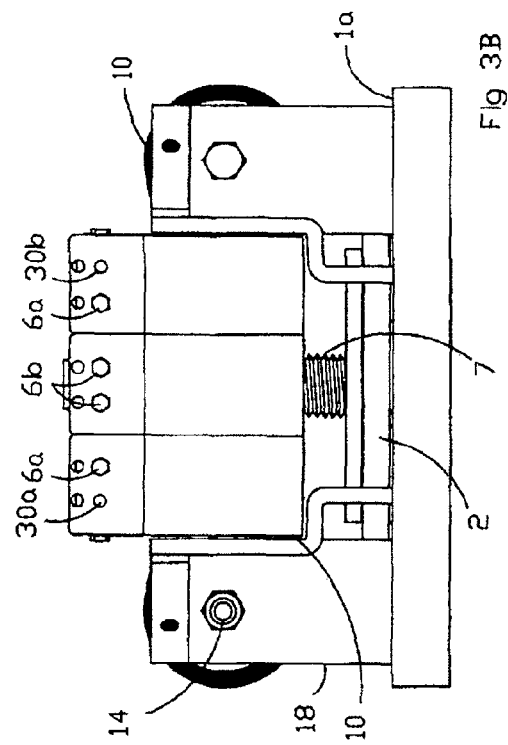
FIG. 3B illustrates a lateral view for the modified pressure relief valve of FIG. 1 with the dome-like cap removed.
Figure 3A:
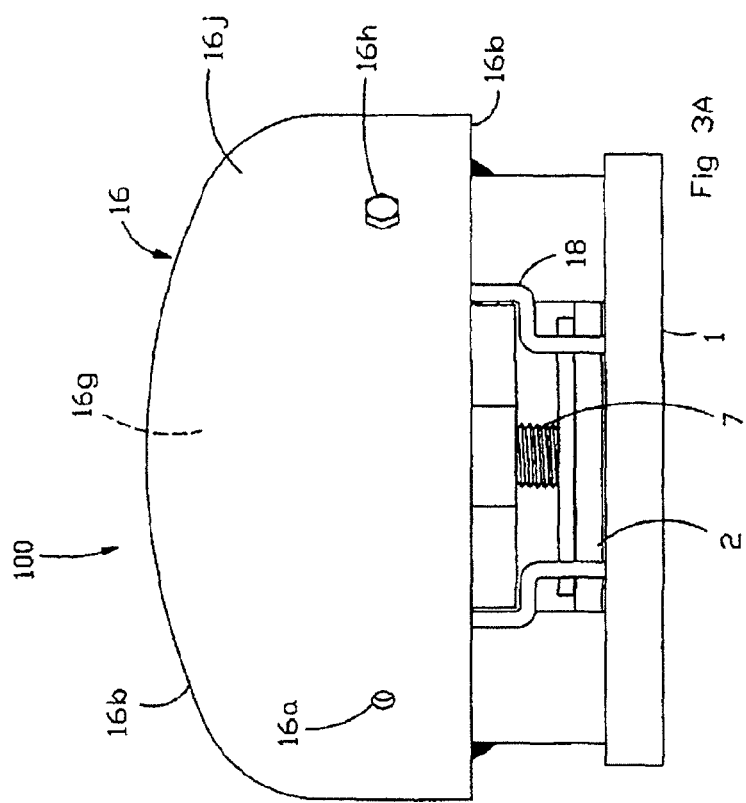
FIG. 3A illustrates a lateral view for the modified pressure relief valve of FIG. 1.
Figure 17C:
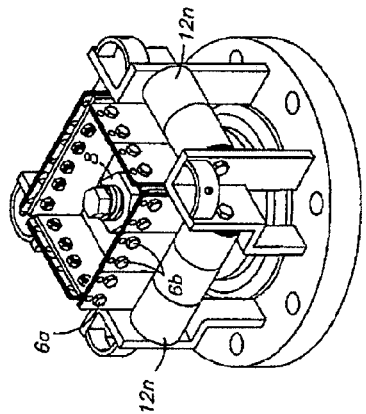
FIG. 17C illustrates a preferred anterior perspective view of the preferred dual preset pressure relief valve under normal operating conditions, with spring bracket arches, and without the dome-like cover.

Each spring bracket 18 also comprises a single bracket arch 18v that contains a single bracket arch aperture 18p. Each bracket arch aperture 18p can congruently and reversibly align with a domelike opening circular aperture 16a, infra. FIG. 3A. With this congruent alignment, domelike cover 16 can reversibly attach to a corresponding spring bracket 18 by insertion of a single metal bolt 6b or other metal attaching device 6 through congruently aligned aperture pairs 18p, 16a. As best seen in FIGS. 17A and 17C, each bracket arch 18v attaches to vertical spring bracket 18 preferably by welding proximal to upper spring bracket edges 18gg.

Spring Plate 9 and Spring Assemblies 10

Referring now to FIGS. 5, 6, 7, 12A and 12B, dual preset pressure relief valve 1 preferably comprises a single spring plate 9. Spring plate 9 is preferably is preferably (i) made of A36 carbon steel or 304 stainless steel (ii) four inches in length (ii) six inches in width and (iii) three-sixteenths inch in thickness. Spring plate 9 is preferably rectangular in shape with four edges 9c, 9d, 9e and 9f. Spring plate 9 preferably has a single flat upper spring plate surface 9a and a single flat lower spring plate surface 9b. Lower spring plate surface 9b preferably includes a single downwardly protruding rigid wider cylindrical segment 9s that is preferably (i) cylindrical in longitudinal shape (ii) perpendicular to lower spring plate surface 9b (iii) smooth and (iv) centrally and concentrically positioned along circular lower spring plate surface 9b. Wider cylindrical segment 9s is preferably (i) 6.28 inches in circular circumference and (ii) one inch in longitudinal length.

Spring plate cylindrical segment 9s is preferably (i) continuously welded to single spring plate lower surface 9b and (ii) axially aligned with spring plate central threaded circular aperture 9aa. Spring plate cylindrical segment 9s also comprises a single circular interior central threaded segment aperture 9ss. Aperture 9ss is preferably continuously and concentrically aligned with spring plate circular central threaded aperture 9bb. Preferably spring plate cylindrical segment aperture 9ss and spring plate central circular threaded aperture 9aa are (i) in continuous linear vertical alignment with each other and (ii) together comprise a continuous cylindrical threaded bore 9aa. This continuous cylindrical threaded bore 9aa mechanically and operatively mates with exterior threaded screw segment surface segment 7c described in more detail infra. Spring plate 9 thereby operatively and mechanically engages screw assembly 7 in an aligned, continuous and vertical manner. At all times spring plate 9 preferably remains positioned (i) perpendicular to inserted screw assembly 7 and (ii) parallel to valve flange flat upper surface 1a.

Referring to FIGS. 5, 6, 7, 12A and 12B, preferably positioned at each of four corresponding spring plate exterior edges 9c, 9d, 9e, 9f of spring plate 9 are a single corresponding first, second, third and fourth upwardly protruding spring plate elevated walls 9g. Each elevated spring plate wall 9g is preferably (i) rigid and smooth (ii) identical in structure and dimensions to remaining walls 9g (iii) 1.63 inches in height and (iv) co-extensive along and with each corresponding spring plate wall exterior edge 9c, 9d, 9e, 9f. Each elevated spring plate wall 9g is also preferably (i) three-sixteenths inch in thickness (ii) perpendicular to and vertically protruding from spring plate upper surface 9a (iii) rigid and (iv) welded to a corresponding spring plate exterior edge 9c, 9d, 9e, 9f.

Two first opposing elevated spring plate walls 9g preferably contain (i) four identical spring wall apertures 9h (ii) linearly aligned with each other along a corresponding spring plate wall upper edge 9gg and (iii) in pairs. Two second remaining elevated opposing spring plate walls 9g preferably each contain (i) six identical spring wall apertures 9h (ii) linearly aligned with each other along corresponding spring plate wall upper edges 9gg. Preferably, each spring wall aperture 9h is circular and sized to tightly receive a corresponding single fusible bolt 6a, conventional bolt 6b or other mechanical attachment device 6 for attachment of a spring assembly 10, as described infra. In some embodiments each conventional bolt 6b or other mechanical attachment device comprises a (i) single ¼-20 cap screw 10k made of 18-8SS steel and (ii) each cap screw 10k mechanically retains a corresponding spring assembly 10 rigidly to spring block 9.

Referring to FIGS. 2, 3B, 5, 6, 12A and 12B, preferably mechanically attaching to two first opposing elevated spring plate walls 9g are first and second physically separate and individual, but adjoining and contiguously contacting linearly aligned constant force spring assemblies 10. Preferably mechanically attaching to each of the two second remaining opposing spring plate elevated walls 9g are three physically separate individual spring and linearly aligned assemblies 10. For both the two constant force spring assembly configuration and three spring assembly configuration, each individual spring assembly 10 is coiled upon a single cylindrical spring drum 12 infra.

For the three spring assembly configuration, there is preferably (i) a single centrally positioned spring assembly 10 and (ii) two exterior spring assemblies 10 that are each adjacent and contiguous to central spring assembly 10 (iii) along a corresponding longer spring drum bolt 13m, infra. For the two spring assemblies 10 configurations, first and second spring assemblies 10 are preferably aligned with, and adjacent to, each other along a single spring drum bolt 13n enclosed within an appropriately sized spring drum 12 infra. Each coiled spring assembly 10 contains a longitudinal cylindrical space 10g through which a single corresponding spring drum 12 inserts while enclosed a corresponding spring drum bolt 13.

Referring to FIGS. 8B, 8C, 8D and 9, each spring assembly 10 preferably (i) am identical to the remaining spring assemblies 10 and comprise seven to ten leaf springs 30. Each individual leaf spring 30 is preferably (i) 0.031 inch in thickness (ii) two inches in width and (iii) 15.25 inch in longitudinal length. Each individual spring proximal end 30c comprises first and second linearly aligned punched leaf spring circular apertures 30a, 30b respectively. Each leaf spring circular aperture 30a or 30b (i) reversibly receive a fusible bolt 6a or a metal conventional bolt 6b (ii) to attach spring assembly 10 to a corresponding spring plate elevated wall 9g (iii) through each individual leaf spring proximal end apertures 30a, 30b at leaf spring proximal end 30c. Fusible bolts 6a are preferably (i) one-quarter inch in cross-sectional diameter (ii) three/quarters inch in longitudinal length and (iii) made from glass filed nylon.

Spring Drum 12 and Spring Drum Bolt 13

Referring to FIGS. 6, 7, 9, 15A and 15C, each individual constant force spring assembly 10 preferably is continuously coiled upon a single corresponding cylindrical spring drum 12. There are preferably two opposing short spring drums 12m and two opposing longer spring drums 12n [collectively spring drums 12]. Each single spring drum 12m, 12n has a single first drum end 12c and a second drum end 12d. Both longer and shorter spring drums 12m, 12n are preferably co-extensive in longitudinal length with corresponding spring drum bolts 13m, 13n respectively infra.

Each cylindrical spring drum 12m, 12n contains (i) a corresponding cylindrical interior drum longitudinal bore 12b. Bore 12b is preferably (i) co-extensive in longitudinal length for shorter spring drum 12m and longer spring drum 12n respectively as the case may be and (ii) with a cross-sectional diameter sufficient for an enclosed spring drum bolt 13 to easily rotate within, infra. Spring drums 12m, 12n are preferably fabricated from HHS tubing to minimize weight, but stainless steel or aluminum are also satisfactory. Cylindrical spring drum bore 12b is preferably (i) aligned along single longitudinal axis 12f (ii) that is centrally positioned (i) within each spring drum 12 and (ii) through the entire longitudinal length of spring drum 12. Each spring drum 12 has a smooth hard exterior surface 12a that exhibits minimal frictional resistance to reversibly coiling and uncoiling spring leaves 30.

Referring to FIGS. 2, 5, 15A and 15C each shorter and longer spring drum 12m, 12n respectively contains a single continuous straight, smooth and rigid shorter spring drum bolt 13m or longer spring drum bolt 13n respectively within longitudinal spring drum bore 12b [collectively spring drum bolts 13]. Preferably one opposing pair of spring drum bolts 13 are short spring drum bolts 13m, while the remaining opposing pair of spring drum bolts 13 are longer spring drum bolts 13n. Spring drum bolt 13 is the component around which a single corresponding (i) spring drum 12 and (ii) spring assembly 10 rotate during operation of valve 100. Each spring drum bolt 13 preferably comprises a (i) single machined rod 13a (ii) single 7/16 by 1½ inch threaded end 13e (iii) single first opposing spring bolt end 13d and (iv) single second opposing spring bolt end 13b.

Figure 5:
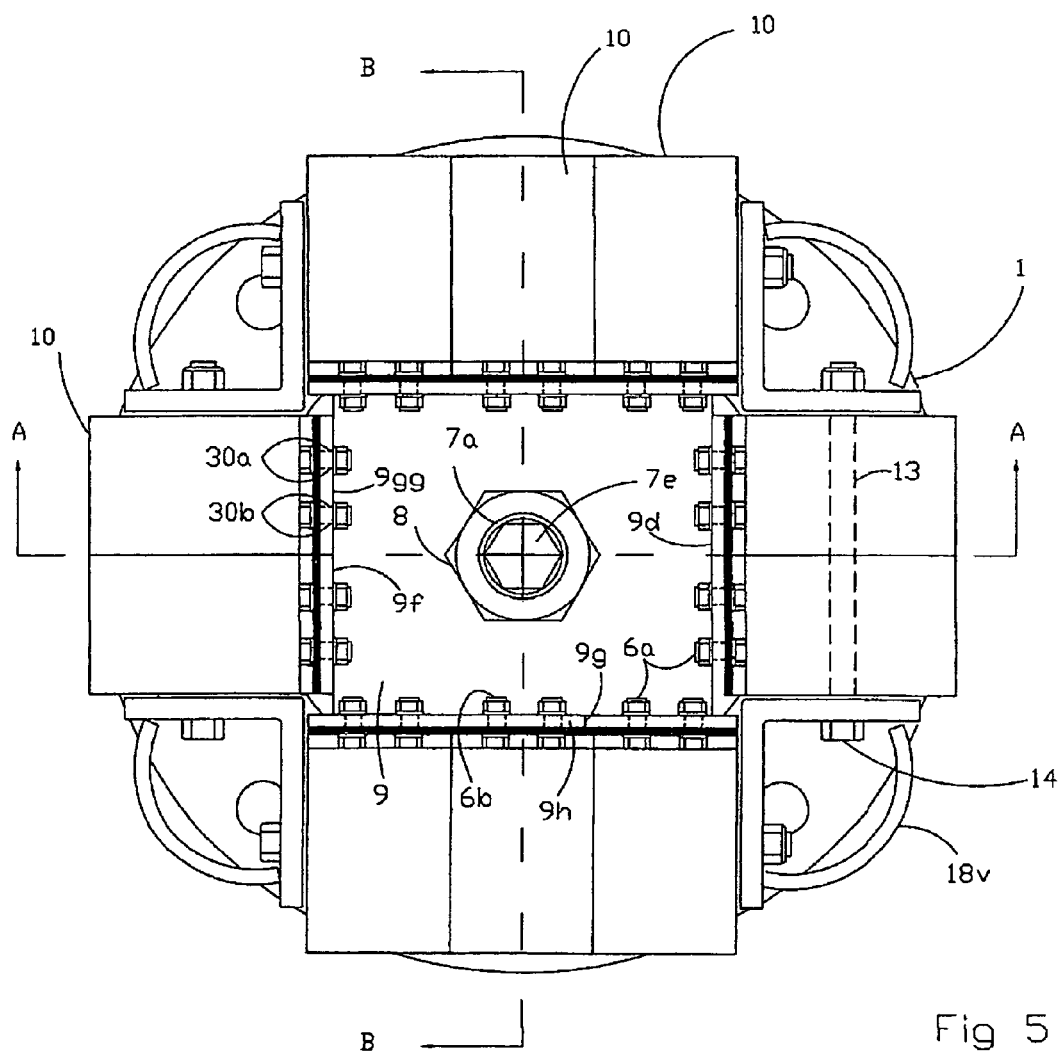
FIG. 5 illustrates an uppermost plan view of the modified pressure relief valve of FIG. 1 with the dome-like cap removed.

Second opposing spring bolt end 13b comprises single bolt threaded segment 13e, while first opposing spring bolt end 13d comprises a single bolt hexagonal cap end 13f. Bolt hexagonal cap end 13f is preferably 9/32 inch long and 5/8 inch wide, while single bolt threaded segment 13e is preferably one inch in longitudinal length. FIGS. 2, 3B and 5. Each spring drum bolt 13 is preferably made of steel plated metal or stainless steel.

Referring to FIGS. 12A and 12B, each spring drum bolt 13 is inserted through (i) spring bracket apertures 18s of two adjoining spring brackets 18 or (ii) spring bracket apertures 18ss of two adjoining spring brackets 18. When so inserted, each drum bolt 13 functions as the rotating component for a single spring assembly 10 coiled around a single spring drum 12. Each single shorter cylindrical drum bolt 13m is preferably (i) five and one-half inches in longitudinal length and (ii) seven-sixteenths inch in cross-sectional diameter. Each longer cylindrical drum bolt 13n is preferably seven and one-half inches in longitudinal length and (ii) seven-sixteenths inch in circular cross-sectional diameter. Each spring drum bolt 12 requires a 5/16-14 nylon insert nut 13h.

Referring now to FIGS. 2, 5, 6, 8C, 8D, each individual spring assembly 10 preferably mechanically attaches to a corresponding single spring plate elevated wall 9g with (i) fusible bolts 6a or (ii) fusible and conventional bolts 6b while coiled upon a spring drum 12 that encloses a single corresponding spring drum bolt 13 of the appropriate longitudinal length. However, in other embodiments, other mechanical attaching devices 6, both fusible and otherwise, are also satisfactory. Bolts 6a, 6b attach to spring plate elevated walls 9g by insertion through pairs of congruently aligned (i) single spring elevated wall aperture 9h and (ii) single corresponding spring assembly upper first or second aperture 30a or 30b as the case may be.

A preferred material for fusible bolts 6a is rigid solid nylon, and an even more preferred material is glass filled nylon. Fusible bolts 6a can be pre-selected for a melting point to correspond to a specific rail tank car or similar container contents. For example, but not exclusively, a fusible nylon GF bolt 6a is most preferred, but a fusible bolt 6a made of polyurethane 40% GF is satisfactory for a melting point of 370 degrees F. Other rigid materials, such as plastics or metals with appropriate melting points, are also satisfactory if they exhibit (i) necessary mechanical strength and other relevant physical properties (ii) at standard normal operating temperatures and pressures.

As best seen in FIGS. 5, 12A and 12B each spring plate 9 preferably has two pairs of opposing spring plate elevated walls 9g. Each spring plate elevated wall 9g has a single upper wall edge 9gg. Each pair of two opposing spring plate elevated walls 9g will both contain either four or six linearly aligned spring plate wall apertures 9h. Furthermore, to attach to any spring plate elevated wall 9g, each spring assembly 10 requires preferably two physically separate mechanical attachments through spring assembly first and second proximal apertures 30a, 30b respectively. Each opposing spring plate elevated wall 9g (i) with six spring plate elevated wall apertures 9h (ii) can congruently align with three pairs of first and second spring assembly proximal end apertures 30a, 30b. Similarly, two opposing spring plate elevated walls 9g, each with four linearly aligned spring plate elevated wall apertures 9h, can congruently align with two pairs of first and second spring assembly proximal end apertures 10a, 10b. When so aligned a fusible bolt 6a, metal bolt 6b or other mechanical attaching device 6 can insert within congruently aligned apertures 10a, 9h or 10b, 9h and thereby form a mechanical attachment between the spring assembly 10 and spring plate elevated wall 9g.

Rotating Screw Assembly 7

Referring to FIGS. 2, 3A, 3B, 6, 7, 12B and 14, screw assembly 7 comprises an upper single threaded cylindrical screw segment 7a that is preferably (i) one and one-eighth inches in cross-sectional diameter (ii) five inches in longitudinal length and (iv) made of steel or stainless steel. Encircling and continuously contacting threaded cylindrical screw segment 7a is preferably a single jam nut 8. Jam nut 8 rotates in a vertical upward or downward direction along screw assembly threaded exterior surface 7c to tighten and thereby maintain threaded cylindrical screw segment 7a at a specific perpendicular vertical linearly aligned distance above and below spring plate 9. When screw assembly 7 inserts through spring plate central circular aperture 9bb, threaded screw assembly exterior threaded surface 7c operatively mates with (i) interior threaded circular surface 9t of spring plate central circular aperture 9bb and (ii) interior threaded surface 9p of spring plate lower cylindrical segment 9s.

As best seen in FIGS. 5, 6 and 7, preferably integrally attached to the uppermost threaded cylindrical segment end 7d is hexagonal wrenching nut 7e. Hexagonal wrenching nut 7e is the mechanical component by which the operator rotates screw assembly 7 to preset operatively attached spring assemblies 10, infra. Threaded screw assembly segment 7a preferably penetrates vertically aligned single flat circular lower disk 7g through centrally positioned lower disk circular aperture 7h. However, in other embodiment's circular lower disk 7g is an integral portion of screw assembly 7. Flat circular lower disk 7g is preferably (i) five and one-quarter inches in circular diameter and (ii) five-sixteenths inch in thickness.

Referring to FIG. 6, screw lowermost assembly tip 7k is preferably (i) flat, smooth, cylindrical, rigid and (ii) seven-eighths inch in diameter with (iii) a single one-eighth inch continuous circular bevel 7l. Single lowermost screw assembly tip 7k can reversibly but tightly insert into single concentrically positioned rigid circular disk indentation 2e.

Dome-Like Cover 16

Referring to FIG. 3A and FIGS. 17A-17C, dual preset pressure relief valve 100 preferably includes a single dome-like cover 16 made of steel coated or steel plated metal. Dome-like cover 16 includes dome-like cover exterior surface 16f and a single dome-like cover interior surface 16g. Dome-like cover 16 preferably comprises four circular openings 16a that are (i) equidistantly spaced from each other proximal to dome-like cover exterior edge 16b and (ii) approximately two and one-half inches from dome-like cover exterior edge 16b. Each single dome-like circular opening 16a congruently aligns with a single corresponding spring bracket arch opening 18v when pressure relief valve 100 is properly assembled. A single threaded bolt 16h (i) inserts within each congruently aligned pair of dome-like opening 16a and spring bracket arch opening 18v (ii) to reversibly mechanically attach dome-like cover 16 to a corresponding spring bracket arch 18p.

Single semi-spherical dome-like cover 16 is preferably (i) thirteen and three-eighths inches in diameter (ii) three-sixteenths inch in dome wall thickness and (iii) six and seven-sixteenths inches in maximum semi-spherical dome height. Dome-like valve cover 16 (i) provides a roof-like structure over dual preset pressure relief valve 100 and (ii) completely shelters all valve spring assemblies 10 from tampering and weather II. Preferred Embodiment and Best Mode of Assembly and Operation of Preferred Dual Preset Pressure Relief Valve 100

Operation

The dual preset pressure relief valve 100 described herein does not comprise adhesives in the preferred embodiment, but instead it operates by exclusively mechanical devices and processes. Spring plate 9 preferably mechanically moves upward or downward in (i) a vertical manner (ii) perpendicular to valve flange flat upper surface 1a (iii) when operatively threaded screw assembly 7 rotates within (iv) aligned continuous spring plate cylindrical interior threaded segment opening 9ss and spring plate central circular threaded aperture 9bb.

Rotational movement of screw assembly 7 initially adjusts and together with attached jam nut 8 presets (i) tension on coiled constant force leaf spring assemblies 10 with (ii) resulting downward force upon screw assembly lowermost tip 7k within sealing disk indentation 2e and (iii) circular screw disk 7g upon bearing assembly 22 and sealing disk groove 2c. This opposing downward force, i.e., tension from all spring assemblies 10 operatively attached to spring plate 9, is the value at which (i) sealing disk 2 initially dislodges from continuous raised circular seal retainer lip 4f (ii) whenever opposing pressure from rail tank car or similar container contents exceeds this value.

Vertical movement of screw assembly 7 will coil or uncoil attached spring assemblies 10 (thereby changing tensions from spring assemblies 10). The spring assemblies 10 translate this force/tension to sealing disk 2 against valve sealing retainer 4. The operator adjusts spring assembly force/tension by rotating adjustment screw 7 until STD pressure (preferably 75 psi +/−3 psi) is achieved. The valve's preset pressure measurements are recorded and mechanically locked into place by jam nut 8. Under standard conditions the valve manufacture preferably initially sets the pressure relief valve 100 to the appropriate discharge pressure as described infra.

The pressure at which pressure relief valve 100 through vents (i.e., discharges the contents of the rail tank car or similar container) through circular valve flange aperture 1c under normal operating conditions depends upon (i) tank internal pressure and (ii) the opposing spring assembly force upon sealing disk 2. Referring to FIG. 12A, prior to attachment of dome-like cover 16, each of two first opposing spring plate elevated walls 9g are attached to (i) two linearly aligned spring assemblies 10 wherein (ii) these spring assemblies 10 are both coiled upon (ii) a shorter single spring drum 12m enclosing a single shorter spring bolt 13m. These four spring assemblies 10 with shorter spring bolts 13m attach to (i) each of two opposing spring plate elevated walls 9g with fusible bolts 6a through congruently aligned proximal spring assembly aperture 30a, 30b and 9h. Simultaneously shorter spring bolts 12m attach at spring bolt ends 12a, 12b respectively through two spring plate apertures 18s of adjacent spring brackets 18, such as spring brackets 18a, 18b.

Similarly, each of the remaining two opposing spring plate elevated walls 9g attach to (i) three linearly aligned spring assemblies 10 (ii) coiled around a longer single spring drum 12n that (ii) encloses a single longer spring bolt 13n. Each spring plate elevated wall 9g attaches to adjoining three spring assemblies 10 with (i) four fusible bolts 6a and two conventional metal bolts 6b. As best seen in FIG. 12A, preferably two conventional bolts 6b are centrally positioned between two pairs of fusible bolts 6a along each remaining two opposing spring plate elevated walls 9g.

The temperature at which pre-selected fusible bolts 6a spontaneously melt depends in large part upon (i) the contents of the rail tank car or similar container and (ii) the physical strength of the tank shell or container shell. Fusible bolts 6a of a material with the required melting temperature are attached in combination with conventional bolts 6b to spring plate elevated walls 9g and spring assemblies 10 in the manner described supra. As best seen in FIG. 12B, when fusible bolts 6a melt there is preferably only one spring assembly 10, operatively attached with conventional bolts 6b, on each of two corresponding opposing spring wall side 9g. With melting of most operative attaching devices (preferably fusible bolts 6a) to spring assemblies 10, there is a dramatic decrease in valve generated force to oppose the rail tank car or similar container generated pressure.

Consequently, rail tank car or similar container content (i) escapes from under sealing disk 4 and (ii) dissipates prior to reaching the specific combustion temperature and/or rupture of the rail tank car shell or similar container shell. Whenever a rail tank car or a similar container 52 exhibits an internal pressure less than the force from pre-calibrated preset spring assemblies 10 (i) there is no leakage around the sealing disk 2 and (ii) sealing disk 2 does not separate from valve sealing retainer 4. If and when tank contents internal pressure equals the pre-set spring assembly force, then pressure relief valve 100 will vent fluid but sealing disk 2 will not completely disengage from valve sealing retainer 4.

Whenever tank internal fluid pressure exceeds the opposing force of spring assemblies 10, then sealing disk 2 will completely vertically disengage from valve seat retainer 4. When tank pressure falls below this pre-set value after fluid venting, sealing disk 2 will reseat upon seal retainer 4. Sealing disk 2, together with seal retainer 4 and seal 3 are realigned to prevent vapor and liquid from leakage until another pressure overage occurs.

Assembly of Dual Preset Pressure Relief Valve 100

Figure 17B:
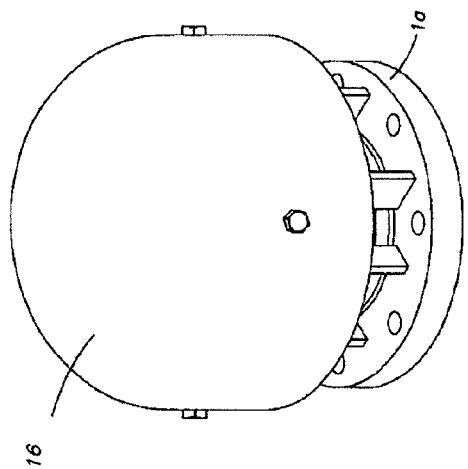
FIG. 17B illustrates a pressure relief valve with a domelike cover attached.
Figure 17A:
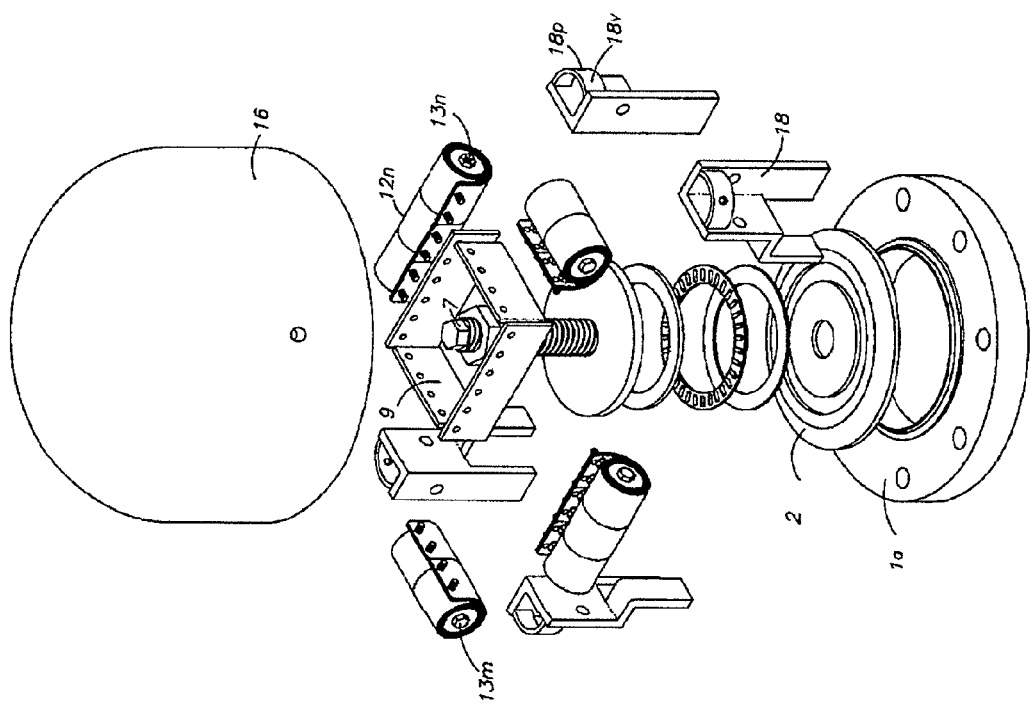
FIG. 17a illustrates an exploded view of the preferred dual preset pressure relief valve.

As best seen in FIGS. 17A-17C, a single preferred dual preset pressure relief valve is assembled in the best mode as follows:

1. Spring brackets 18 are attached to flat valve circular flange 1a by welding.
2. Flexible circular seal 3 is inserted snugly within lower sealing disk channel 2d and secured with spiral ring 20.
3. Sealing disk 2, now containing flexible circular seal 3 and spiral ring 20, is vertically aligned with circular flange aperture 1c and in vertical contacting engagement with seal retainer 4 and seal retainer lip 4f.
4. Bearing assembly 22 components are next inserted within upper sealing disk channel 2c in the following order: thin lower thrust washer 22c, needle bearing 22a and finally upper thrust washer 22b.
5. Each spring drum 12 is inserted within a spring assembly longitudinal space 12d.
6. For longer spring drums 13 a single constant force spring assembly 10 with stainless steel bolts 6b is initially attached to a single spring plate elevated wall 9g. Next (i) a spring assembly 10 with fusible nylon bolts 6a is attached to the same spring plate elevated wall 9g and (ii) next another spring assembly 10 is attached to the same spring plate elevated wall 9g with stainless steel bolts 6b.
7. For shorter drums 13m each of two spring assemblies 10 is attached to a single spring plate elevated wall 9g with two stainless steel bolts 6b.
8. Remaining spring assemblies 10, coiled upon spring drums 12, are all attached to spring plate 9 by inserting bolts 6a, 6b into corresponding spring plate apertures 9h. Nylon insert nuts 13f are then applied to each bolt 6a, 6b and tightened.
9. Screw assembly 7 is now inserted into spring plate 9 through jam nut 8.
10. Spring plate 9 with attached spring assemblies 10 and screw assembly 7 are next inserted between spring brackets 18.
11. Spring drum bolts 13 are inserted through spring bracket panel apertures 18s, 18ss, and bolts 13 secured with nuts 14 along each bracket panel 18e, 18f.
12. Adjustment screw 7 is next tightened by rotating adjustment screw 7 clockwise to elevate spring plate 9 and thereby increases tension in spring assemblies 10 against spring drums 12 to preferably 75 psi.
13. The valve manufacturer achieves the specific preset pressure of step 12 supra of preferably 75 psi by initially mounting dual preset pressure relief valve 100 onto a suitable test device. This test device preferably includes a flange mounted to a surface (i) with sufficient fittings to pressurize the flange and attached pressure relief valve (ii) with one or more calibrated pressure gauges.
14. This preset pressure of preferably 75 psi is locked into place with jam nut 8.
15. Dome-liked over 16 is placed over pressure relief valve 100 and secured with four dome-like cover bolts 6c through congruently aligned pairs of domelike apertures 16a and spring plate panel arch apertures 18v.

Attachment of Dual Preset Pressure Relief Valve 100 to Rail Tank or Transportable/Stationary Container 51, 52

The customer installs the assembled pressure relief valve 100 valve upon the upper surface 51 of the rail tank car or similar container 52 after the preset procedure described supra. In the preferred embodiment, upper container or tank surface 51 comprises tank mounting flange gasket groove 40 that is greater in all dimensions than pressure relive valve flange tongue 41. Tank mounting flange gasket groove has (i) an outer diameter of preferably 9.00 inch (ii) an inner diameter of approximately 8.25 inch and (iii) a height of preferably approximately 0.025 inch.

The installer places a single pressure relief gasket 44 within tank mounting flange groove 40. Pressure relief gasket 44 is preferably approximately 0.125 inch in thickness and (ii) an elastomeric material or hard rigid composite from the group consisting of (i) ethylene propylene diene monomers, compressed fiber sheet gasket materials, co-polymers of hexaflouropropylene, vinylidene fluoride, terpolymers of tetrafluoroethylene; vinylidene fluoride, hexafluoropropylene and perfloromethylvinyl ethers. The installer (i) lowers the dual preset pressure relief valve 100 into groove 40 and (ii) aligns the valve's eight ¾ inch diameter bolt apertures with the tank upper surface's eight mounting studs 57a, 57b, 57c, and 57d [collectively mounting studs 57]. Each mounting stud 57 is preferably approximately ⅝ inch in diameter.

The installer next applies eight nuts 58a, 58b, 58c, 58d, each preferably of ⅝ inch diameter, to corresponding studs 57a, 57b, 57c, 57d protruding above valve flange 1h. The installer tightens bolts in a criss-cross bolting pattern by which (i) each bolts is tightened and (ii) thereafter an opposing bolt is tightened in a manner well known in this particular industry. During this procedure each bolt is tightened to a torque of preferably 150-180 foot pounds. The installer finally pressurizes the tank car and tests for leaks at the joint created by and between the valve flange and the tank flange.

The above description includes the preferred embodiment and other embodiments and best modes of the invention. However, this description not preclude still other embodiments, modes, changes in the details, materials, steps and arrangement of the invention that lie within the principle and scope of the above described invention, and as designated in the appended claims.

The invention claimed is:

1. A dual preset pressure relief valve comprising valve components by which said pressure relief valve can relieve pressure from contents within a rail tank car or closed container or at a first temperature and a second temperature,
    said valve components comprising constant force spring assemblies, a spring plate and mechanical attaching components,
    said mechanical attaching components attaching said constant force spring assemblies to said spring plate, said mechanical attaching components comprising a first plurality and a second plurality,
    said second temperature being the melting temperature of a second material, said second plurality of said mechanical attaching components comprising said second material,
    said melting temperature of said second material being lower than the melting temperature of said first plurality,
    said second plurality disconnecting from said spring plate and said constant force spring assemblies at said melting temperature of said second material,
    said first plurality remaining connected to said spring plate and said constant force spring assemblies at said melting temperature of said second material.

2. The dual preset pressure relief valve of claim 1 further comprising a valve flange with an upper surface, said valve further comprising spring brackets and spring drums,
    each said spring bracket comprising a first stepped spring bracket panel and a second straight spring bracket panel, said first stepped spring bracket panel comprising a vertical stepped structure,
    said first stepped spring bracket panel supporting at least three linearly aligned said constant force spring assemblies, wherein two said first stepped spring bracket panels adjoin each other along said valve upper surface,
    said at least three linearly aligned said constant force spring assemblies containing a single inserted first spring drum of a first longitudinal length, each said first spring drum
    inserting within said two adjacent first stepped spring bracket panels,
    said second straight spring bracket panel comprising a straight vertical structure,
    said second straight spring bracket panel supporting two linearly aligned constant force spring assemblies, and wherein two said second spring bracket panels adjoin each other along said valve upper surface,
    said two linearly aligned said constant force spring assemblies containing a single inserted second spring drum of a second longitudinal length, each second spring drum inserting within two adjacent said second straight spring bracket panels, and
    each said second spring drum being of a lesser longitudinal length than each said first spring drum.

3. The dual preset pressure relief valve of claim 1 wherein said second plurality of said mechanical attaching components comprises bolts, said bolts comprising glass filled nylon.

4. The dual preset pressure relief valve of claim 1 wherein more than one-half of said mechanical attaching components comprise
    said second material, said valve comprising more than eight said constant force spring assemblies.

5. The dual preset pressure relief valve of claim 1 wherein said second plurality of said mechanical attaching components comprises a first portion and a second portion of said mechanical attaching components,
    said spring plate comprising a first pair of opposing sides and a second pair of opposing spring plate sides,
    said first portion of said second plurality of said mechanical attaching components opposing each other across said first pair of said opposing spring plate sides,
    said second portion of said second plurality of said mechanical attaching components opposing each other across said second pair of said opposing spring plate sides, and
    said first plurality of said mechanical attaching components attaching to said first pair of said opposing spring plate sides.

6. The dual preset pressure relief valve of claim 1 wherein each said constant force spring assembly comprising seven to ten leaves.

7. The dual preset pressure relief valve of claim 1 wherein said spring plate comprises a four sided polygon, said second plurality of said mechanical attaching components aligning along all said sides of said spring plate, said second plurality melting at a lower temperature than said first plurality of said mechanical attaching components.

8. The dual preset pressure relief valve of claim 1 wherein said valve comprises a spiral spring retaining ring within a removable sealing disk in combination with a flexible circular seal,
    said removable sealing disk comprising a solid integral circular component, said removable sealing disk comprising a single lower sealing disk circular surface and a single upper disk circular surface, said lower sealing disk circular surface being conical in configuration,
    said lower sealing disk circular surface comprising a single circular continuous circular sealing disk channel and a single continuous circular sealing disk channel lip,
    said lower circular sealing disk channel and said circular sealing disk channel lip being contiguous with each other,
    said flexible circular seal snugly and continuously lodged with said single sealing disk lower channel,
    said spiral spring retaining ring inserting into said sealing disk circular channel lip.

9. The dual preset pressure relief valve of claim 1 wherein said mechanical attaching components attach sets of three linearly aligned constant force spring assemblies to said spring plate,
    each said set comprising two said constant force spring assemblies attaching to said spring plate with said second plurality of mechanical attaching components, and
    each said set comprising a single constant force spring assembly attaching to said spring plate with said first plurality of said mechanical attaching components.

10. The dual preset pressure relief valve of claim 1 wherein a portion of said constant force spring assemblies are linearly aligned within sets of three said constant force spring assemblies,
    and wherein two said linearly aligned constant force spring assemblies within each said set attach to said spring plate with four of said second plurality of said mechanical attaching devices,
    and wherein the centrally positioned constant force spring assembly attaches to said spring plate with two of said first plurality of said mechanical attaching devices.

11. The dual preset pressure relief valve of claim 1 wherein said valve comprises spring drums and a first plurality of vertical spring brackets and a second plurality of vertical spring brackets,
    said first plurality of said vertical spring brackets supporting three constant force spring assemblies along a corresponding said spring drum, said second plurality of said vertical spring bracket supporting two constant force spring assemblies along a corresponding said spring drum.

12. The dual preset pressure relief valve of claim 1 wherein said first plurality of said mechanical fastening components consists of metal.

13. The dual preset pressure relief valve of claim 1 wherein each said constant force spring assembly is approximately two inches in width.

14. The dual preset pressure relief valve of claim 1 comprising ten constant force spring assemblies, and each said constant force spring assembly being approximately two inches in width.

15. The pressure relief valve of claim 1 wherein said constant force spring assemblies create an opposing pressure,
   said second plurality of said mechanical attaching components melting at a temperature that minimizes said opposing pressure by disconnecting said constant force spring assemblies from said spring plate,
   said mechanical attaching components thereby preventing said pressure relief valve from achieving a maximum opposing pressure.

16. The pressure relief valve of claim 1, said pressure relief valve not comprising adhesives.

17. The dual preset pressure relief valve of claim 1 further comprising a valve flange with an upper surface, said valve further comprising spring brackets along said upper surface,
   each said spring bracket comprising a first stepped spring bracket panel and a second straight spring bracket panel,
   said first stepped spring bracket panel comprising a vertical stepped structure,
   said first stepped spring bracket panel supporting at least three linearly aligned said constant force spring assemblies, and wherein two said first stepped spring block panels adjoin each other along said valve upper surface,
   said second spring bracket panel comprising a straight vertical structure,
   said second spring bracket panel supporting no more than two linearly aligned constant force spring assemblies, and wherein two said second spring bracket panels adjoin each other along said valve upper surface.

* * * * *